(12) United States Patent
Jones et al.

(10) Patent No.: US 12,475,270 B2
(45) Date of Patent: Nov. 18, 2025

(54) INTERACTIVE TOOL FOR DESIGN AND ANALYSIS OF EXPERIMENTS WITH DIFFERENT USAGE MODES

(71) Applicant: JMP Statistical Discovery LLC, Cary, NC (US)

(72) Inventors: Bradley Allen Jones, Cary, NC (US); Joseph Albert Morgan, Raleigh, NC (US); Mark Wallace Bailey, Haddonfield, NJ (US); Jacob Davis Rhyne, Dallas, NC (US); Ryan Adam Lekivetz, Cary, NC (US); Caleb Bridges King, Morrisville, NC (US)

(73) Assignee: JMP STATISTICAL DISCOVERY LLC, Cary, NC (US)

( * ) Notice: Subject to any disclaimer, the term of this patent is extended or adjusted under 35 U.S.C. 154(b) by 271 days.

(21) Appl. No.: 17/982,872

(22) Filed: Nov. 8, 2022

(65) Prior Publication Data

US 2023/0281347 A1    Sep. 7, 2023

Related U.S. Application Data

(60) Provisional application No. 63/340,701, filed on May 11, 2022, provisional application No. 63/317,488, filed on Mar. 7, 2022.

(51) Int. Cl.
*G06F 30/12* (2020.01)
*G06F 30/27* (2020.01)
(Continued)

(52) U.S. Cl.
CPC .............. *G06F 30/12* (2020.01); *G06F 30/27* (2020.01); *G06F 2111/04* (2020.01); *G06F 2111/06* (2020.01)

(58) Field of Classification Search
CPC ...... G06F 30/12; G06F 30/27; G06F 2111/04; G06F 2111/06
See application file for complete search history.

(56) References Cited

U.S. PATENT DOCUMENTS

| 10,296,680 B2 | 5/2019 | Morgan et al. |
| 10,318,674 B2 | 6/2019 | Morgan et al. |

(Continued)

OTHER PUBLICATIONS

SAS Institute Inc. 2012. JMP® 10 Design of Experiments Guide, Design of Experiments Guide, Jun. 2012, JMP, Version 10, pp. 1-346 (Year: 2012).*

(Continued)

*Primary Examiner* — Ryan F Pitaro
*Assistant Examiner* — Bernard E Cothran
(74) *Attorney, Agent, or Firm* — COATS & BENNETT, PLLC

(57) ABSTRACT

A computing device receives user input for a design of an experiment. The user input indicates respective factor identities for factors in the design of the experiment, respective response identities for responses to options for the factors in the design, and a user-defined objective for the one or more responses. Additionally, based on the user input, the computing device displays a subset of a set of multiple model types and a user-definable amount of design runs for the design. Each design run presents settings according to the design for each of the factors. The computing device also receives settings indicating a user-selected model type from the subset and a user-defined amount of design runs, and based on the settings, selects one or more design construction criteria for generating the design. The computing device then generates the design according to the design construction criteria.

7 Claims, 34 Drawing Sheets
(6 of 34 Drawing Sheet(s) Filed in Color)

(51) Int. Cl.
  *G06F 111/04* (2020.01)
  *G06F 111/06* (2020.01)

(56) References Cited

U.S. PATENT DOCUMENTS

| | | | |
|---|---|---|---|
| 10,386,271 B1 * | 8/2019 | King | G01M 99/005 |
| 10,535,422 B2 | 1/2020 | Lekivetz et al. | |
| 10,902,162 B2 | 1/2021 | Morgan et al. | |
| 2009/0125270 A1 * | 5/2009 | O'Shea | G06F 11/263 |
| | | | 702/108 |
| 2012/0079379 A1 * | 3/2012 | Hathaway | G06Q 10/06 |
| | | | 715/709 |

OTHER PUBLICATIONS

JMP, "Introduction to Profilers: Visualize Response Surfaces and Optimize Processes", Jul. 30, 2020, pp. 1-3, retrieved on Jul. 22, 2022, retrieved from Internet: https://www.jmp.com/support/hlep/en/15.0/index.shtml#/page/jmp/profilers.shtml.

JMP, "Optimality Criteria", Nov. 29, 2021, pp. 1-6, retrieved on Jun. 10, 2022, retrieved from Internet: https://www.jmp.com/support/help/en/16.1/#page/jmp/optimality-criteria.shtml#.

JMP, "Profilers", Version 16, Aug. 1, 2021, pp. 1-200, JMP.

* cited by examiner

▼ Factors

| Role | Choices |
|---|---|
| | The factor ○ can take any value between a low and high level.<br>▲ Show Hint<br>○ lies between a low and high value but can be set to user specified values.<br>How many levels do you have? [2]<br>▲ Show Hint — 930<br>◉ consists of a specified number of categories, groups, or kinds. — 922<br>How many levels do you have? [2] — 926<br>▲ Show Hint — 932 |

Factor Table

Add Factor  number of factors [1]   [Remove Selected]

| Name | Role | Changes | Values | | | Units |
|---|---|---|---|---|---|---|
| ▼ Leg Width | Categorical | Easy | Small | Medium | Large | |
| ◤ Rotor Length | Continuous | Easy | 2 | 6 | | |
| ◤ Leg Length | Continuous | Easy | 3 | 4 | | |
| ▶ Paper Clip | Categorical | Easy | Yes | No | | |
| ▶ Paper Type | Categorical | Easy | Heavy | Light | | |

| Model 1101 | Designer 1102 |
|---|---|
| Main Effects | Custom Design (D-Optimal) |
| Main Effects uncorr. with 2FI | DSD or Custom Design (Alias Optimal) |
| Main Effects incl. all 2FI | Custom Design (D-Optimal) |
| Response Surface Design | Custom Design (I-Optimal) |

▷ Fraction of Design Space Plot

◢ Estimation Efficiency

| Term | Fractional Increase in CI Length | Relative Std Error of Estimate |
|---|---|---|
| Intercept | 0.01 | 0.27 |
| Temp | 0.01 | 0.27 |
| X2 | 0.018 | 0.272 |
| X3 | 0.018 | 0.272 |
| X4 | 0.018 | 0.272 |

◢ Alias Matrix

| Effect | Temp*X2 | Temp*X3 | Temp*X4 | X2*X3 | X2*X4 | X3*X4 |
|---|---|---|---|---|---|---|
| Intercept | 0 | 0 | 0 | 0.167 | -0.08 | -0.17 |
| Temp | 0 | 0 | 0 | 0.167 | 0.417 | -0.17 |
| X2 | -0.11 | 0.148 | 0.444 | 0.037 | -0.04 | 0.296 |
| X3 | 0.222 | -0.19 | -0.22 | 0.037 | 0.296 | -0.04 |
| X4 | 0.444 | -0.15 | -0.11 | 0.296 | 0.037 | 0.037 |

1240

◢ Design Diagnostics

| | |
|---|---|
| D Efficiency | 98.45986 |
| G Efficiency | 87.66234 |
| A Efficiency | 97.03504 |
| Average Variance of Prediction | 0.220679 |
| Design Creation Time (seconds) | 0 |

| | Leg Width | Rotor Length | Leg Length | Paper Clip | Paper Type |
|---|---|---|---|---|---|
| 1 | Small | 6 | 6 | No | Light |
| 2 | Medium | 6 | 4 | Yes | Heavy |
| 3 | Large | 6 | 4 | No | Heavy |
| 4 | Medium | 2 | 3 | Yes | Light |
| 5 | Medium | 2 | 3 | No | Heavy |
| 6 | Large | 2 | 3 | Yes | Light |
| 7 | Large | 6 | 3 | No | Light |
| 8 | Medium | 6 | 4 | No | Heavy |
| 9 | Small | 2 | 3 | Yes | Light |
| 10 | Large | 2 | 4 | Yes | Heavy |
| 11 | Small | 2 | 4 | Yes | Light |
| 12 | Small | 2 | 4 | No | Light |

FIG. 13B

Usage Mode
● Flexible
○ Guided

| Define | Model | Design | Data Entry | Analyze | Predict | Report |

▼ Generalized Regression for Model Parameters

▼ ⊟ Generalized Regression for Y

▼ Model Comparison

| Show | Response Distribution | Estimation Method | Validation Method | Nonzero Parameters | AICc | BIC | Generalized RSquare |
|---|---|---|---|---|---|---|---|
| ✓ | Normal | Standard Least Squares | None | 8 | 76.801434 | 32.780687 | 0.9507906 |
| ✓ | Normal | Best Subset | AICc | 4 | 34.532986 | 30.758327 | 0.9048117 |

▲ Model Launch

▼ ⊟ Standard Least Squares

▼ Model Summary

Response            Y
Distribution         Normal
Estimation Method   Standard Least Squares
Validation Method   None
Mean Model Link     Identity
Scale Model Link    Identity Save 1600
1602
1604

*FIG. 16A*

Model Summary

| | |
|---|---|
| Response | Y |
| Distribution | Normal |
| Estimation Method | Standard Least Squares |
| Validation Method | None |
| Mean Model Link | Identity |
| Scale Model Link | Identity |
| Measure | |
| Number of rows | 16 |
| Sum of Frequencies | 16 |
| -LogLikelihood | 19.756817 |
| Number of Parameters | 11 |
| BIC | 70.012109 |
| AICc | 127.51363 |
| RSquare | 0.9783205 |
| RSquare Adj | 0.9458012 |
| RASE | 0.8318214 |

▲ Parameter Estimates for Original Predictors

▲ Parameter Estimates for Original Predictors

| Term | Estimate | Std Error | Wald ChiSquare | Prob > ChiSquare | Lower 95% | Upper 95% |
|---|---|---|---|---|---|---|
| Intercept | 9.7333226 | 0.6430906 | 229.07513 | <.0001* | 8.4728882 | 10.993757 |
| X1 | 5.1329298 | 0.4295507 | 142.79129 | <.0001* | 4.2910258 | 5.9748337 |
| X2 | 3.0266382 | 0.4295507 | 49.646892 | <.0001* | 2.1847342 | 3.8685422 |
| X3 | 0.0295464 | 0.4295507 | 0.0047313 | 0.9452 | -0.812358 | 0.8714504 |
| X1*X1 | -2.005485 | 0.8365884 | 5.7466538 | 0.0165* | -3.645168 | -0.365802 |
| X1*X2 | 4.0333925 | 0.4802523 | 70.53457 | <.0001* | 3.0921153 | 4.9746698 |
| X2*X2 | 0.5415566 | 0.8365884 | 0.4190482 | 0.5174 | -1.098126 | 2.1812396 |
| X1*X3 | -0.083139 | 0.4802523 | 0.0299692 | 0.8626 | -1.024417 | 0.8581378 |
| X2*X3 | 0.2442375 | 0.4802523 | 0.2586341 | 0.6111 | -0.69704 | 1.1855148 |
| X3*X3 | -0.23986 | 0.8365884 | 0.0822041 | 0.7743 | -1.879543 | 1.3998226 |

| Normal Distribution Parameters | Estimate | Std Error | Wald ChiSquare | Prob > ChiSquare | Lower 95% | Upper 95% |
|---|---|---|---|---|---|---|
| Scale | 1.3583587 | 0.9605047 | 2 | 0.1573 | -0.524196 | 3.2409132 |

▷ Effect Tests

Parameter estimates are presented in Table 3.

| Term | Response Y Estimate | Lower 95% | Upper 95% |
|---|---|---|---|
| Intercept | 0.60745 | 0.12126 | 1.09363 |
| Leg Width 1 | -0.2565 | -0.9441 | 0.43107 |
| Leg Width 2 | 0.22782 | -0.4597 | 0.91539 |
| Rotor Length | 0 | -0.5108 | 0.51076 |
| Leg Length | 1.70495 | 1.21877 | 2.19114 |
| Paper Clip | 0.4978 | 0.01161 | 0.98398 |
| Paper Type | 0.23558 | -0.2506 | 0.72177 |

Table 3: Parameter Estimates

FIG. 19B

INTERACTIVE TOOL FOR DESIGN AND ANALYSIS OF EXPERIMENTS WITH DIFFERENT USAGE MODES

CROSS-REFERENCE TO RELATED APPLICATIONS

This application claims the benefit of, and priority based on, 35 U.S.C. § 119 to U.S. Provisional Application No. 63/340,701, filed May 11, 2022, and U.S. Provisional Application No. 63/317,488, filed Mar. 7, 2022, the disclosures of each of which are incorporated herein by reference in their entirety.

BACKGROUND

A user designing an experiment may use computer tools to determine the settings for one or more factors in a design for the experiment and to evaluate the design. The user may also use computer tools to generate a computer model according to the design (e.g., for simulating responses for the experiment to analyze the design or make predictions regarding outcomes for the design).

SUMMARY

In an example embodiment, the present disclosure provides a computer-program product tangibly embodied in a non-transitory machine-readable storage medium. The computer-program product includes instructions operable to cause a computing system to receive, using a graphical user interface, user input for a design of an experiment. The user input indicates one or more respective factor identities for one or more factors in the design of the experiment, one or more respective response identities for one or more responses to options for the one or more factors in the design of the experiment, and at least one user-defined objective for the one or more responses. The computer-program product also includes instructions operable to cause the computing system to display, based on the user input, in the graphical user interface, a subset of a set of multiple model types, and a user-definable amount of design runs for the design of an experiment. Each design run of the design runs presents settings according to the design for each of the one or more factors. The computer-program product also includes instructions operable to cause the computing system to receive, in the graphical user interface, settings indicating a user-selected model type from the subset, and a user-defined amount of design runs. The computer-program product also includes instructions operable to cause the computing system to, based on one or more of the settings, select one or more design construction criteria for generating the design of the experiment, and generate the design of the experiment according to the one or more design construction criteria.

Embodiments disclosed herein also include a corresponding apparatus and method. For example, in another example embodiment, the present disclosure provides a computer-implemented method. The method comprises receiving, using a graphical user interface, user input for a design of an experiment. The user input indicates one or more respective factor identities for one or more factors in the design of the experiment, one or more respective response identities for one or more responses to options for the one or more factors in the design of the experiment, and at least one user-defined objective for the one or more responses. The method also comprises displaying, based on the user input, in the graphical user interface, a subset of a set of multiple model types and a user-definable amount of design runs for the design of an experiment. Each design run of the design runs presents settings according to the design for each of the one or more factors. The method also comprises receiving, in the graphical user interface, settings indicating a user-selected model type from the subset and a user-defined amount of design runs. The method also comprises, based on one or more of the settings, selecting one or more design construction criteria for generating the design of the experiment, and generating, by the computing system, the design of the experiment according to the one or more design construction criteria.

In another example embodiment, the present disclosure provides a computing device comprising a processor and memory. The memory comprises instructions executable by the processor wherein the computing device is configured to receive, using a graphical user interface, user input for a design of an experiment. The user input indicates one or more respective factor identities for one or more factors in the design of the experiment, one or more respective response identities for one or more responses to options for the one or more factors in the design of the experiment, and at least one user-defined objective for the one or more responses. Additionally, when executed by the processor, the instructions configure the computing device to display, based on the user input, in the graphical user interface, a subset of a set of multiple model types and a user-definable amount of design runs for the design of an experiment. Each design run of the design runs presents settings according to the design for each of the one or more factors. Additionally, when executed by the processor, the instructions configure the computing device to receive, in the graphical user interface, settings indicating a user-selected model type from the subset and a user-defined amount of design runs. Further, when executed by the processor, the instructions configure the computing device to, based on one or more of the settings, select one or more design construction criteria for generating the design of the experiment, and generate, by the computing system, the design of the experiment according to the one or more design construction criteria.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A-9G illustrate example graphical user interfaces for defining factors, responses, and objectives for a design of an experiment according to at least one embodiment of the present technology.

FIGS. 10A-10C illustrate example graphical user interfaces for generating a model for a design of an experiment according to at least one embodiment of the present technology.

FIG. 11A illustrates example computing logic for selecting design construction criteria according to at least one embodiment of the present technology.

FIG. 11B illustrates an example graphical user interface for generating a design for an experiment according to at least one embodiment of the present technology.

FIGS. 12A-12C illustrate an example graphical user interface for evaluating a design for an experiment according to at least one embodiment of the present technology.

FIGS. 13A-13B illustrate an example graphical user interface for obtaining responses for a design for an experiment according to at least one embodiment of the present technology.

FIGS. 16A-16E illustrate an example graphical user interface for analyzing a model for a design for an experiment in a flexible usage mode according to at least one embodiment of the present technology.

FIGS. 17A-17B illustrate an example graphical user interface for generating a model in a flexible usage mode for use in a guided usage mode according to at least one embodiment of the present technology.

FIGS. 19A-19B illustrate an example graphical user interface for generating a report according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
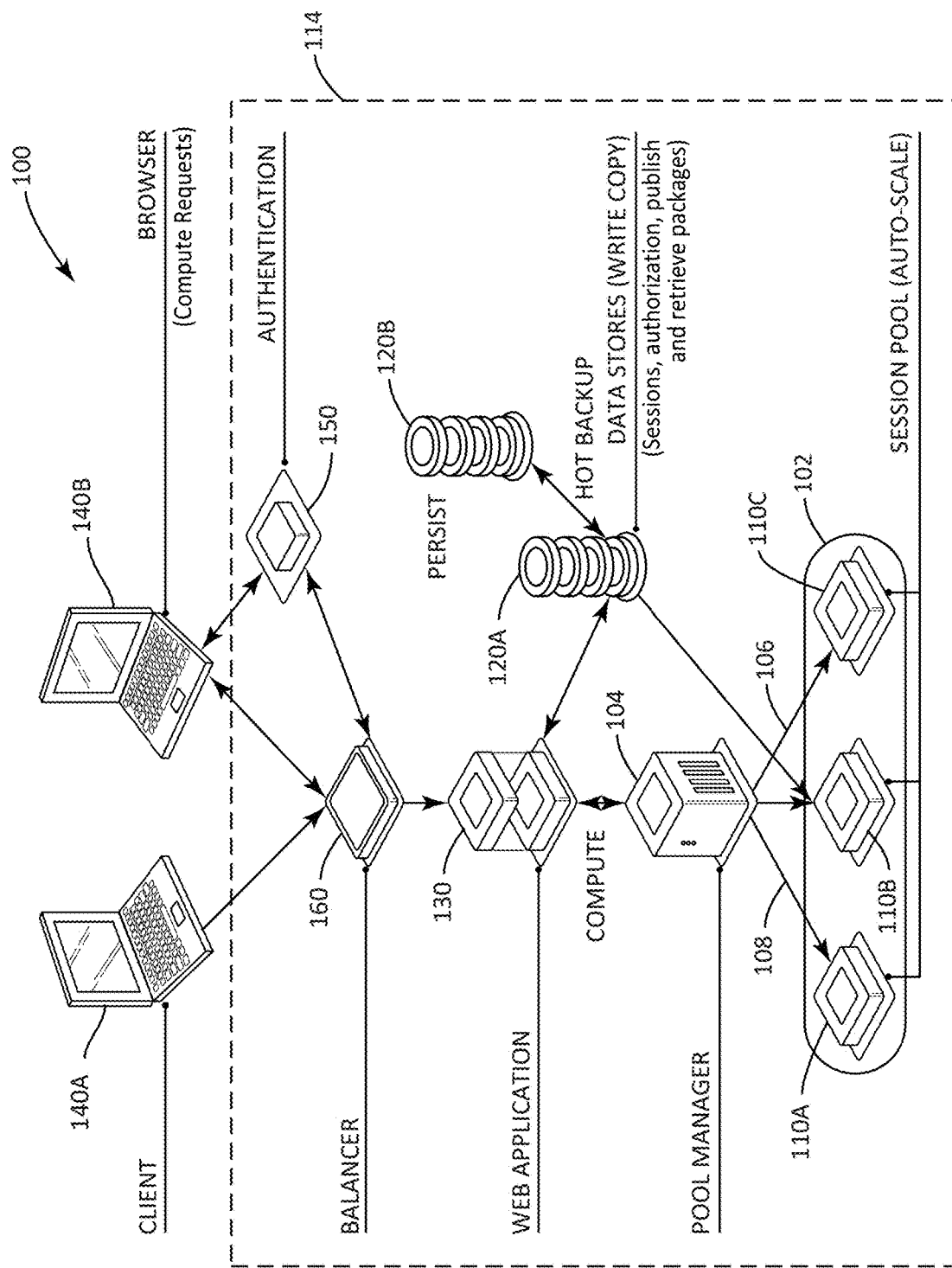
FIG. 1 illustrates an example network, including an example set of devices communicating with each other, according to at least one embodiment of the present technology.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (I) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation). The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it, and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manger 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined, or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
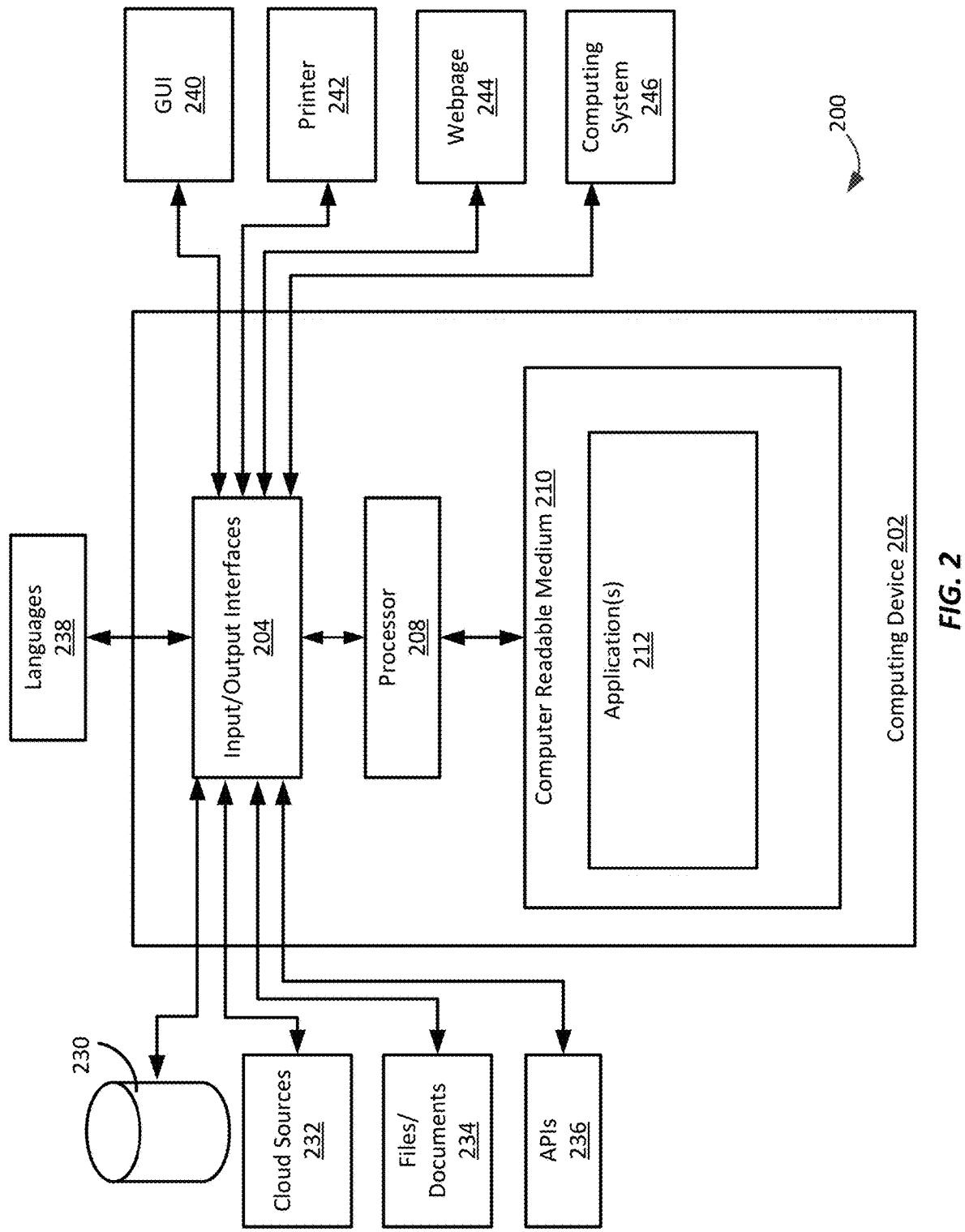
FIG. 2 illustrates a block diagram that provides an illustration of the hardware components of a computing system according to at least one embodiment of the present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming languages, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
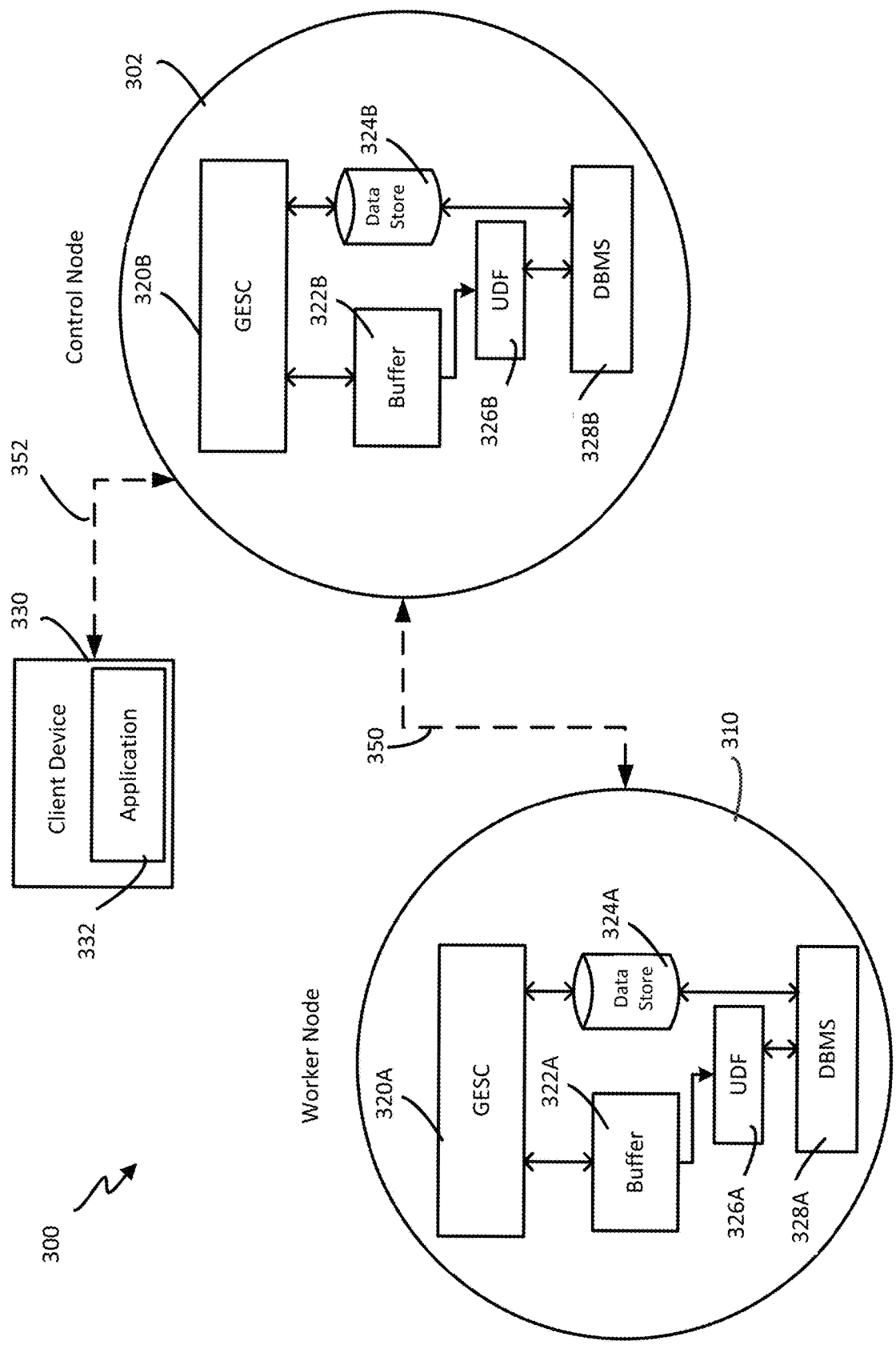
FIG. 3 illustrates a portion of a communications grid computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node in the pool.

Figure 4:
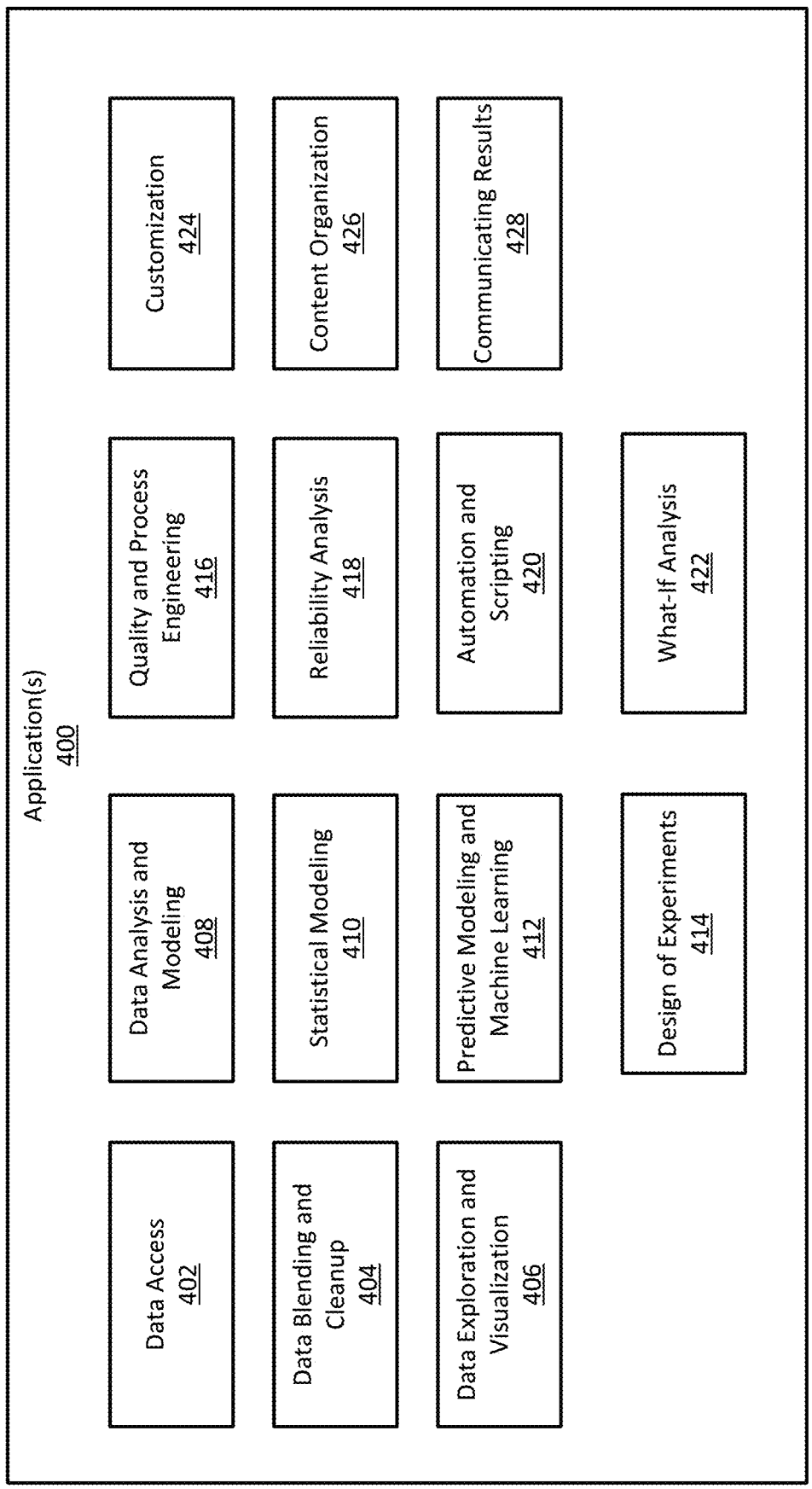
FIG. 4 illustrates a block diagram of example applications according to at least one embodiment of the present technology

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can included statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select the best model). Machine learning methods can be used by the user without having to write code and tune algorithms. Examples of machine learning techniques are described in more detail with respect to FIGS. 5 and 6).

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
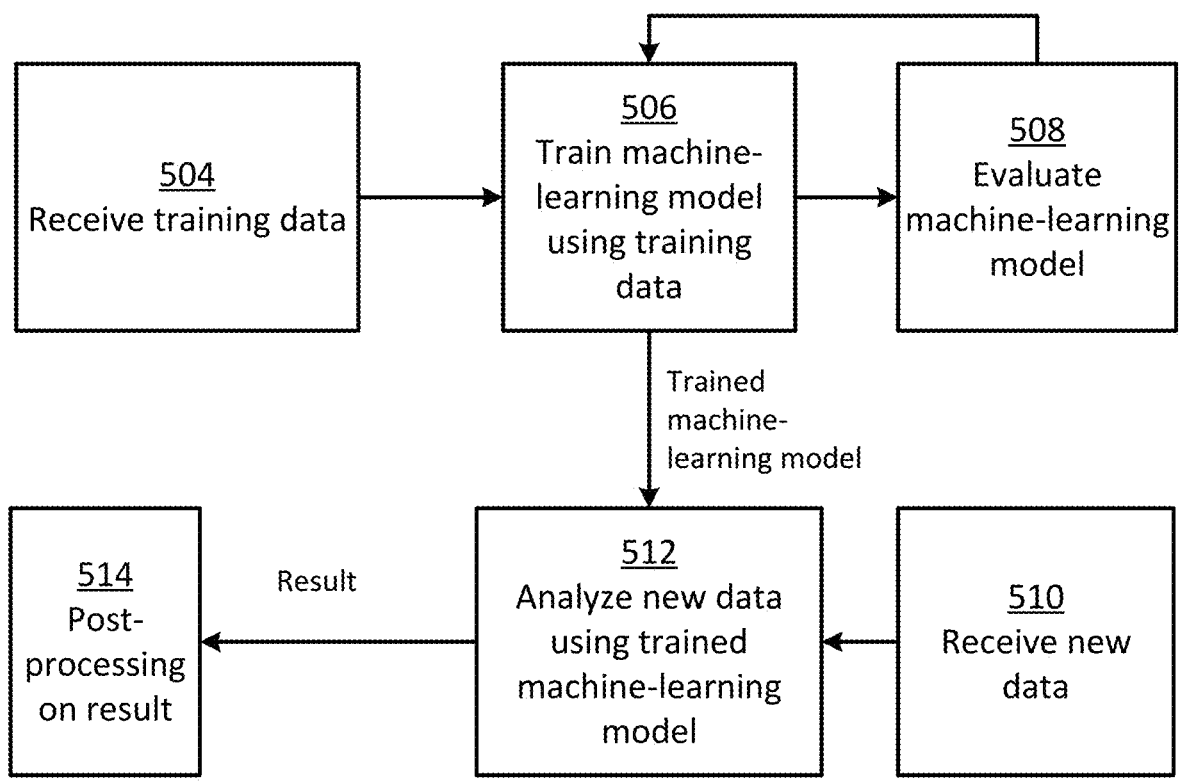
FIG. 5 illustrates a flow chart of an example of a process for generating and using a machine-learning model according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
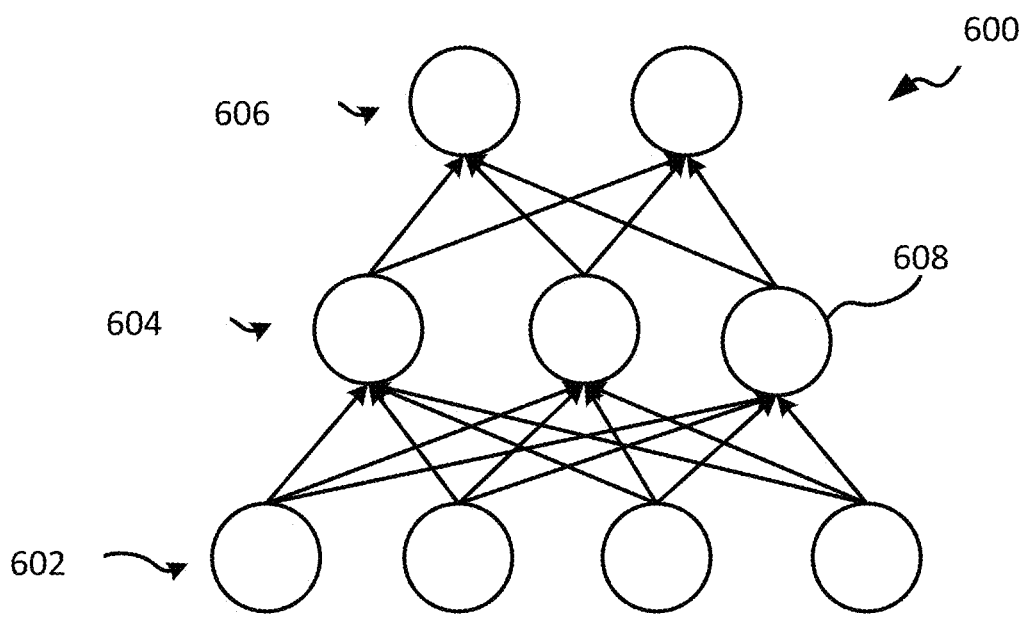
FIG. 6 illustrates an example of a machine-learning model as a neural network according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Figure 7:
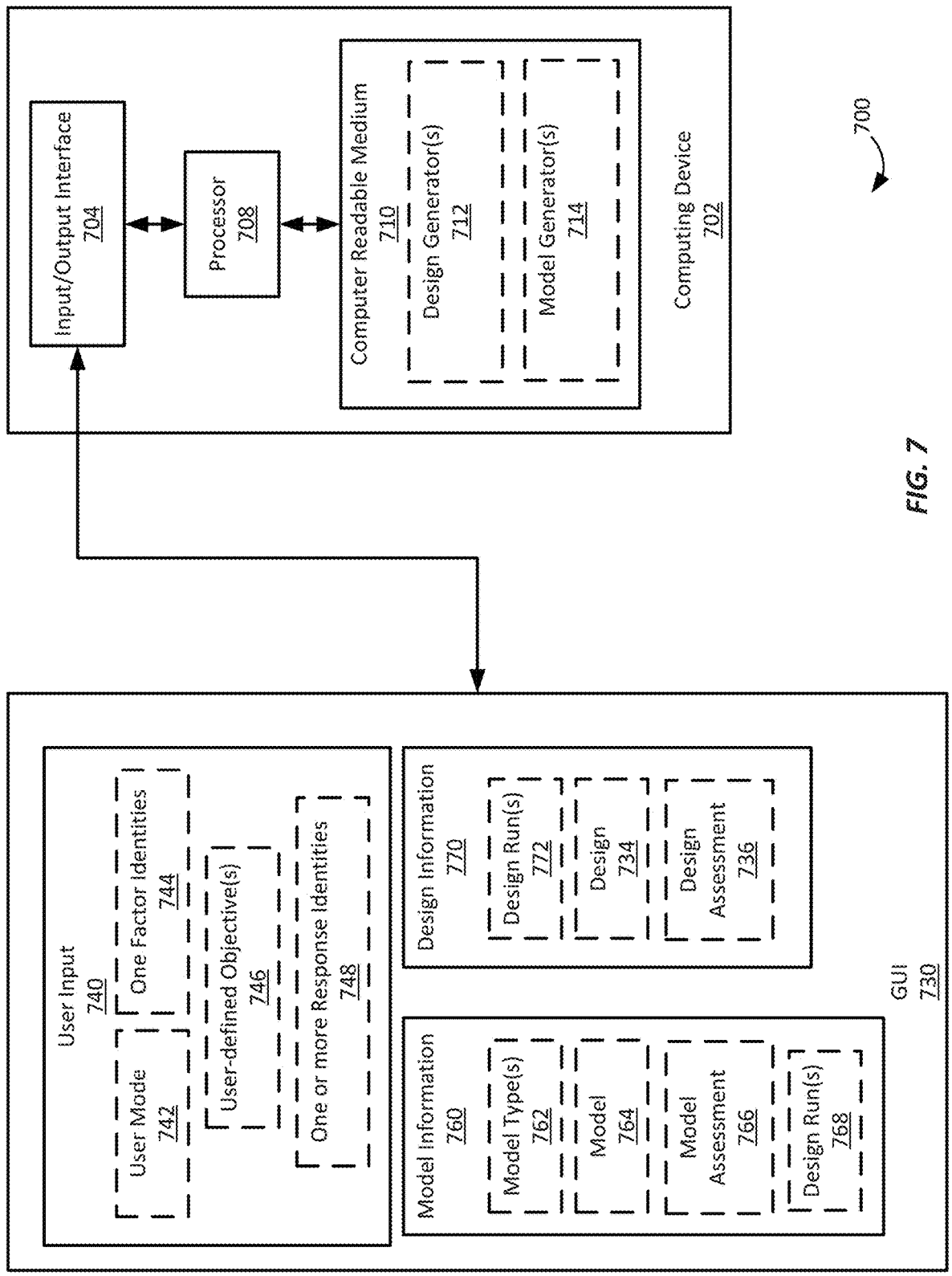
FIG. 7 illustrates a block diagram of a system for a graphical user interface according to at least one embodiment of the present technology.

FIG. 7 illustrates a block diagram of a system 700 for a graphical user interface 730. System 700 includes a computing device 702. The computing device 702 is configured to exchange information between devices in the system 700 (e.g., via wired and/or wireless transmission). For example, the computing device 702 includes an input and/or output interface 704 and an output interface 706 for sending and receiving information. A network (not shown) can connect one or more devices of system 700 to one or more other devices of system 700 not explicitly shown (e.g., an input and/or output devices such as a one displaying a graphical user interface 730 or other devices such as a printer or storage device). Alternatively, or additionally, the system is integrated into one device (e.g., a touch screen of a tablet) and input and/or output interface 704 are internal interfaces.

In one or more embodiments, the computing device 702 receives, using a graphical user interface 730, user input 740. In one or more embodiments, the user input 740 includes a usage mode 742 for controlling the graphical user interface 730 and/or computing device 702. For instance, the usage mode 742 could be a mode restricting options for using the graphical user interface 730 or presenting the options in a different form in the graphical user interface 730 (e.g., depending on the usage mode 742 selected for the user or situation). For instance, there could be a guided usage mode for guiding user input 740 (e.g., by limiting the options or providing information that may be more readily understood by a novice user). There could be a flexible usage mode providing more options for user input 740. Embodiments herein show example graphical user interfaces in different modes.

In one or more embodiments, the user input 740 could be for designing an experiment. For example, the user input includes one or more factor identities 744 (e.g., identifying an amount, type, or identity of factors). For example, the user input 740 may indicate to the computing device 702 that the design of the experiment includes 3 factors, and in response the computing device 702 generates factors X1-X3, or the user input 740 may indicate the factors include a lab site, a chemical tested in the lab, and a chemical quantity, and the computing device generates factors labeled according to these specific identities. Additionally, or alternatively, the user input 740 includes one or more respective response identities 748 for one or more responses to settings for the one or more factors in the design of the experiment. For example, if an experiment is to test different acid chemicals in different quantities, an output response could include the pH of a solution after the acid chemical is added or stirring time to reach a certain pH for the solution. Additionally, or alternatively, the user input 740 includes one or more user-defined objectives 746 for the one or more responses. For example, the objectives for stir time could include minimizing stir time, to maximize the stir time, or to match a certain stir time depending on the goals of the experiment.

In one or more embodiments, the graphical user interface 730 displays information (e.g., received from the computing device 702). The information can be, for example, data that is relevant to a design for an experiment and/or an assumed model (e.g., data representing events, systems, behaviors, etc.) for modeling the experiment. The information can be based on, or responsive to, the user input 740. For instance, in some embodiments the graphical user interface 730 displays model information 760. For example, the model information 760 could include model options for generating a model such as model types 762 (e.g., a main effects model or a response surface design model). In another example, the model information 760 could include options for generating a design (e.g., one or more design run amounts 768). By way of example only, it can be useful in some situations to customize the amount of design runs to the experiment. Design runs 768 present settings according to a design for each of one or more factors. For instance, the settings for one design run may specify a type of chemical tested and a location of testing, while the settings for another design run could specify a different type of chemical and/or a different location. A larger amount of design runs provides more opportunities to experiment with different combinations of settings for various factors, but may increase costs (e.g., time and expense of testing). In some embodiments, the one or more design run amounts 768 can be user-definable (e.g., by a user accepting or changing a suggested number of design runs to a user-defined amount of design runs). Regardless, in one or more embodiments, the model options 760 can be pre-configured (e.g., to restrict available options in a guided usage mode) and/or user customizable (e.g., displaying only a subset of multiple candidate model types for user selection in a guided usage mode).

Additionally, or alternatively, the graphical user interface 730 displays design information 770. For example, the design information could include options for generating a design. For example, as described above, the ability to customize the amount of design runs to the experiment can be useful in some situations. Therefore, in one embodiment, the design options may include one or more design run amounts 772 in addition to, or in lieu of, the one or more design run amounts 768 of model information 760. In such cases, design run amounts 772 are similar to the previously described design run amounts 768, and thus, would present the same settings and options for the design runs. That is, similar to design run amounts 768, design runs amount 772 present settings according to a design for each of one or more factors. For example, as stated above, the settings presented by could be applied to a single design run or different design runs. Additionally, or alternatively, different settings could be applied to different design runs.

In one or more embodiments, the graphical user interface 730 can display one or more computer-generated model options or options for generating a design (e.g., in response to the user selections or settings). For example, the options could include a design 734 and/or a design assessment 736. The design 734, for example, can include settings for factors in design runs. The model options could include, for example, a model 764 and/or a model assessment 766 resulting from selection of options for the model and/or design. The model assessment 766 can include, for example, model terms, significance of model terms, and metrics of model performance. As shown in this example, the graphical user interface 730 can be a single graphical user interface for receiving user input, for displaying options tailored to that input, displaying a generated design and/or model, and displaying one or more assessments of that design and/or model. The design and/or model can be generated by the computing device 702.

For instance, the computing device 702 has a computer-readable medium 710 and a processor 708. Computer-readable medium 710 is an electronic holding place or storage for information so the information can be accessed by processor 708. Computer-readable medium 710 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc. For instance, computer-readable medium 710 can store information obtained by the computing device 702 (e.g., received from an input device in the system 700 such as one implementing a graphical user interface 730).

Computing device 702 includes a processor 708 that executes instructions (e.g., stored at the computer-readable medium 710). The instructions can be carried out by a special purpose computer, logic circuits, or hardware circuits. In one or more embodiments, processor 708 is implemented in hardware and/or firmware. Processor 708 executes an instruction, meaning it performs or controls the operations called for by that instruction. The term "execution" is the process of running an application or the carrying out of the operation called for by an instruction. The instructions can be written using one or more programming languages, scripting language, assembly language, etc. Processor 708 in one or more embodiments can retrieve a set of instructions from a permanent memory device and copy the instructions in an executable form to a temporary memory device that is generally some form of RAM, for example. Processor 708 operably couples with components of computing device 702 (e.g., input and/or output interface 704 and with computer-readable medium 710) to receive, to send, and to process information.

In one or more embodiments, computer-readable medium 710 stores instructions for execution by processor 708. One or more applications stored on computer-readable medium 710 are implemented in software (e.g., computer-readable and/or computer-executable instructions) stored in computer-readable medium 710 and accessible by processor 708 for execution of the instructions.

For example, in one or more embodiments, the computer-readable medium 710 comprises instructions for one or more design generators 712 for generating a design 734 or design assessment 736. For instance, based on one or more settings (e.g., user input 740 such as factor identities 744 and/or response identities 748), the computing device 702 can select one or more design construction criteria for generating the design 734 of an experiment. Design construction criteria could include, for example, criteria for selecting a design generator from the one or more design generators 712 or options for design generation such as a design optimality criterion. The computing device 702 can generate the design 734 of the experiment according to the design construction criteria.

Additionally, or alternatively, the computer-readable medium 710 comprises instructions for one or more model generators 714 for generating a model 764 or model assessment 766 (e.g., based on one or more response according to a design for the experiment).

In one or more embodiments, the generation or display of model information 760 and/or design information 770 can be dependent on user input 740. For instance, there could be a guided usage mode for guiding a user by limiting the options or providing information that may be more readily understood (e.g., limiting what model types 762 are available for user selection or the amount or complexity of model assessment 766 or design assessment 736). There could be a flexible usage mode providing complete user interfaces for the one or more design generators 712 or one or more model generators 714 (e.g., for an experienced user). There could also be one or more "intermediate" usage modes between the guided and flexible usage modes that provide various degrees of support to the user. For example, consider a user that is experienced enough to input some, but not all, of the data for a model using a user interface for a flexible usage mode. In such cases, the user might benefit from the assistance provided by the guided usage mode. Therefore, in at least some embodiments, the user could also be presented with one or more user interfaces for a guided usage mode. In such "intermediate usage mode" cases, the user could switch between the user interfaces associated with the guided and flexible usage modes. The usage mode 742 could be used to control applications implemented by computer-readable medium 710 (e.g., the one or more design generators 712 and one or more models). Alternatively, or additionally, the one or more design generators 712 and one or more models could be controlled by different usage modes. For instance, the user of the graphical user interface 730 could want maximum control over the one or more design generator 712 and use one usage mode that does not limit options, and switch to a usage mode that provides more guidance for generating a model using the one or more model generators 714. In one or more embodiments, the user can seamlessly switch between usage modes for controlling the one or more design generator 712 and the one or more model generators 714 from the graphical user interface 730. One or more embodiments described herein show different graphical user interfaces depending on a usage mode.

Additionally, or alternatively, the one or more applications can be integrated with other analytic tools. Merely for illustration, the applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

One or more applications stored on computer-readable medium 710 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, or additional components can be incorporated into computing device 702. For instance, in one or more embodiments, there are multiple input devices or computing systems (e.g., one to obtain factors and/or options and one to obtain a nesting indication 732). In the same or different embodiments, there are multiple output devices or computing systems (e.g., one to display the graphical user interface 730 and one to receive a generated design or assessment). For instance, in some embodiments, the computer-readable medium 710 controls or interfaces with the one or more design generators 712 and/or one or more model generators 714 supported on one or more remote computing systems (not shown). As another example, the input and/or output interface 704 are separate interfaces, there are more than one input interface that uses the same or different interface technology, and/or there is more than one output interface that uses the same or different interface technology. In some embodiments, the computing device 702 has only one design generator 712 or model generator 714, or the one or more design generators 712 and one or more model generators 714 are combined into a single application.

Figure 8A:
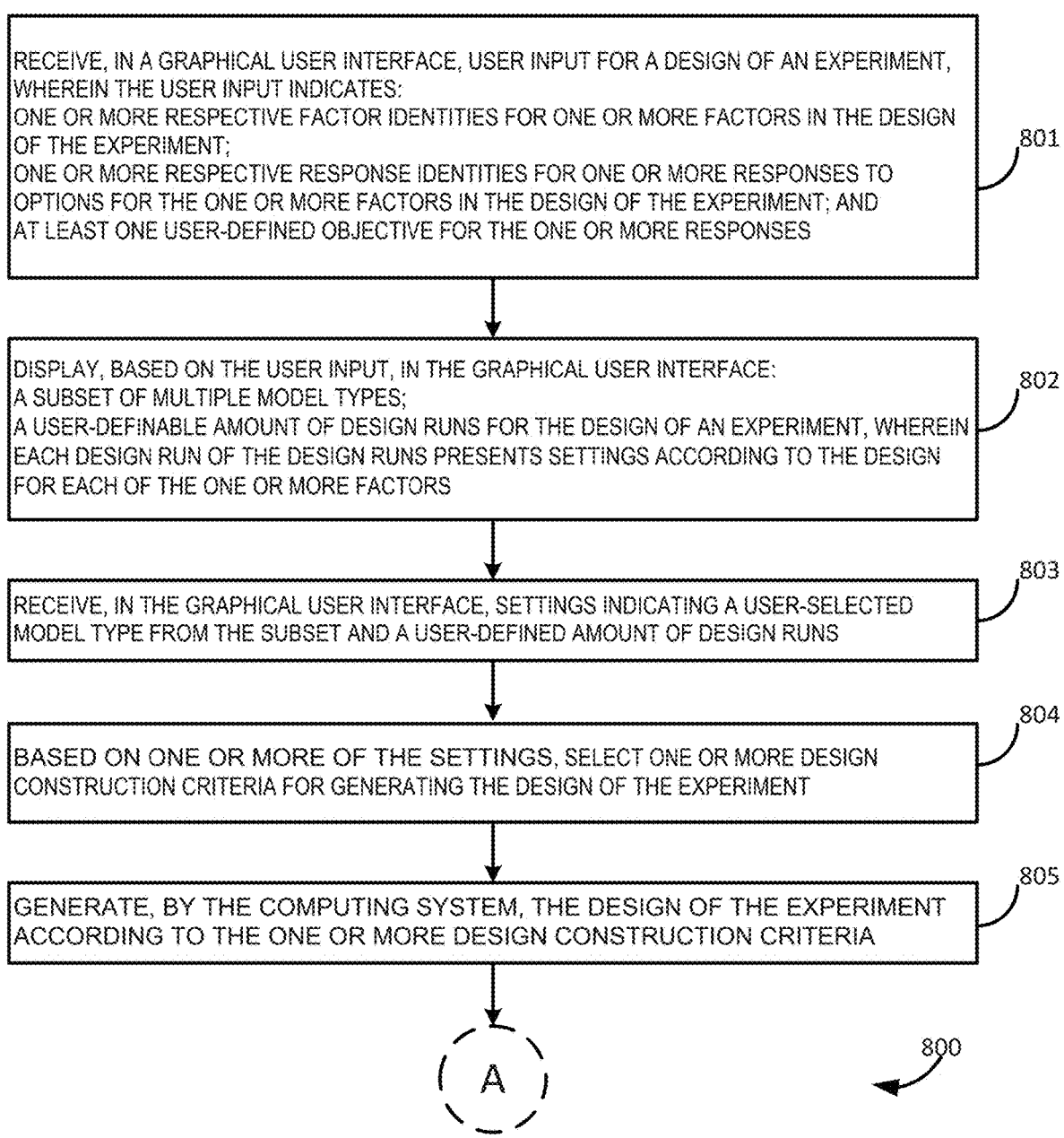
FIG. 8A illustrates a flow diagram for generating a design according to at least one embodiment of the present technology.
Figure 8B:
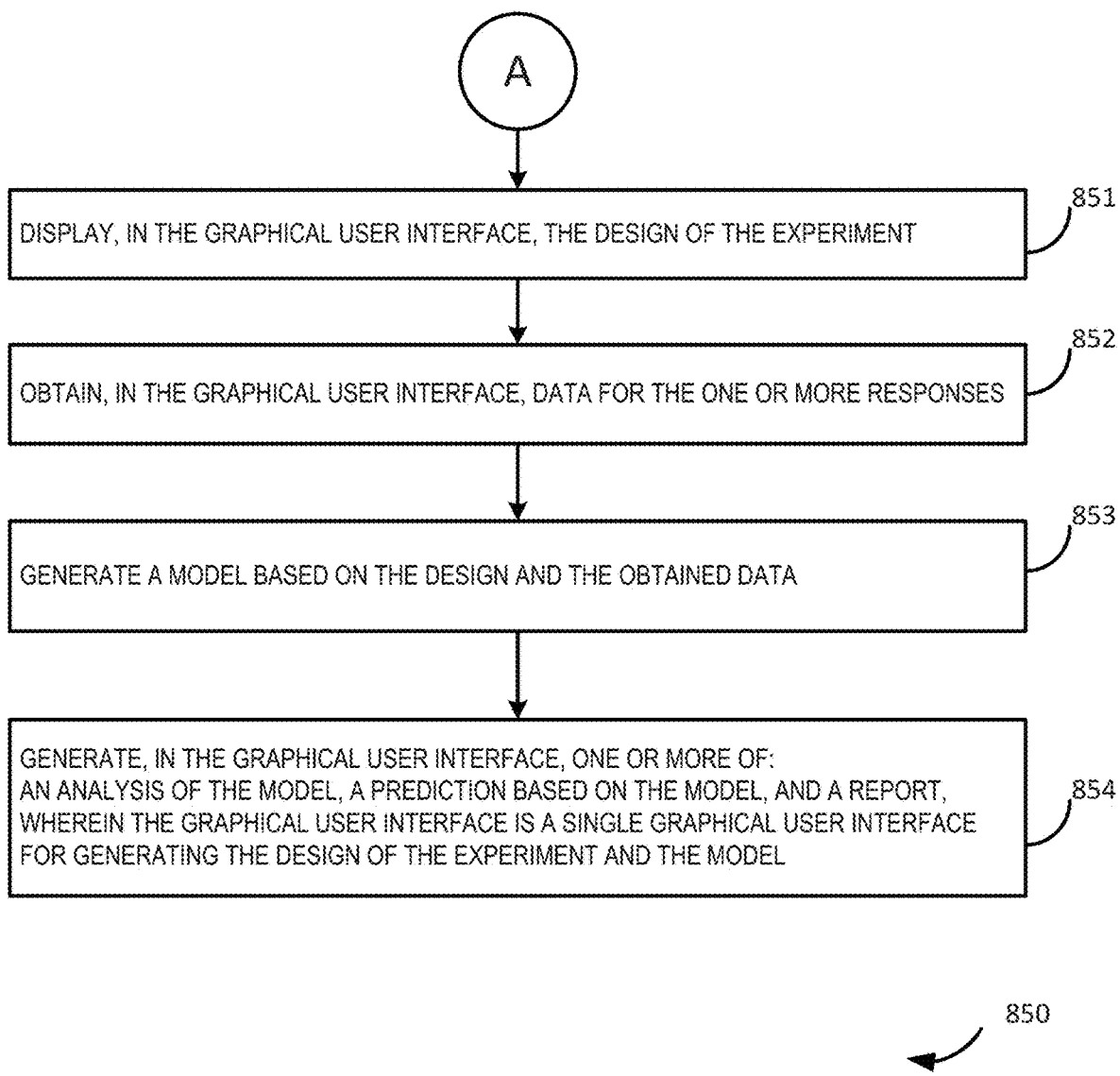
FIG. 8B illustrates a flow diagram for generating a model according to at least one embodiment of the present technology.

In one or more embodiments, a computing system (e.g., the system 700 or computing device 702) implements a method as described herein (e.g., a method shown in FIG. 8A or 8B).

FIG. 8A illustrates a flow diagram of a method 800 for generating a design. The method 800 includes an operation 801 of receiving, in a graphical user interface, user input for a design of an experiment. For instance, the user input can indicate one or more respective factor identities for one or more factors in the design of the experiment. Additionally, or alternatively, the user input can indicate one or more respective response identities for one or more responses to settings for the one or more factors in the design of the experiment. Additionally, or alternatively, the user input can indicate at least one user-defined objective for the one or more responses. For instance, FIGS. 9A-9G, described in more detail herein, show example graphical user interfaces for receiving user input for a design of experiment.

The method 800 includes an operation 802 of displaying, based on the user input, in the graphical user interface a subset of a set of multiple model types and a user-definable amount of design runs for the design of an experiment. Each design run of the design runs presents settings according to the design for each of the one or more factors. For instance, in some usage modes it may be helpful to have less options available to a user to guide them in generating a design. However, embodiments can also allow the user customization even within reduced options (e.g., a user-definable amount of design runs). The method 800 includes an operation 803 of receiving, in the graphical user interface, settings indicating: a user-selected model type from the subset; and a user-defined amount of design runs.

The method 800 includes an operation 804 of, based on one or more of the settings, selecting one or more design construction criteria (e.g., an optimality criterion and/or a design platform) for generating the design of the experiment.

The method 800 includes an operation 805 of generating, by a computing system, the design of the experiment according to the one or more design construction criteria. One or more embodiments advantageously allow operations of method 800 to be conducted in different order than presented here. For instance, a user can make selections on model type and/or amount of runs in operation 803 and then subsequently provide user input on other aspects of the design in operation 801.

In one or more embodiments, a design (e.g., a design generated using the method 800 in FIG. 8A) is used for generating a model. For example, FIG. 8B illustrates a flow diagram of a method 850 for generating a model that can be used as a continuation of method 800 or as its own method.

The method 850 includes an operation 851 of displaying, in the graphical user interface, the design of the experiment. For example, the design could be generated according to the method 800 in FIG. 8A and the graphical user interface can be a single graphical user interface for generating the design and model.

The method 850 includes an operation 852 of obtaining, in the graphical user interface, data for the one or more responses. For instance, the one or more responses could be the result of a simulation of the experiment, or an execution of the experiment, according to a design generated in method 800 of FIG. 8A.

The method 850 includes an operation 853 of generating a model based on the design and the obtained data. The method 850 includes an operation 854 of generating, in the graphical user interface, one or more of: an analysis of the model, a prediction based on the model, and a report. Example graphical user interfaces will be described in more detail herein.

For instance, FIGS. 9A-9G illustrate example graphical user interfaces for defining factors, responses, and objectives for a design of an experiment. The graphical user interface 900 shows examples of different usage modes 904 (e.g., guided and flexible) for a defined view. For instance, in a guided usage mode the graphical user interface may minimize options and statistics for the user, simplify available models (yet allow customization to satisfy real world situations), provide contextual hints to provide guidance to the user (e.g., controlled by disclosure icons), and/or use simple and interactive, visual controls and graphs so that the user can explore data, models, and model fit. In contrast, a flexible usage mode may offer more tools and user control (e.g., to allow a user to build models that are as complex as the user deems appropriate). Additionally, or alternatively, the flexible usage mode can offer more visualization into the design and experimentation (e.g., by providing statistics and a rich set of graphics where appropriate, so that the user can explore the data and model fit, and/or provide dynamically updated, interactive graphs so that the user can visualize the data and model fit). For simplicity examples will be provided for a guided and flexible usage mode, but one of ordinary skill in the art will appreciate more or additional use modes.

The graphical user interface 900 includes various tabs for a user to view different aspects of a workflow (e.g., a workflow for generating a design or a model). For instance, the define view 908 is currently selected in this example (e.g., for defining design features such as response and factors). The graphical user interface 900 in some embodiments may have a save icon 902 for providing a save capability for user changes made to the graphical user interface 900. This save capability allows for users to save their work at an intermediate stage of various workflow so that it can be reinstated at a future point in time, in the same state as when saved. Additionally, or alternatively, the save capability allows users to collaborate with other users by sharing their files (e.g., a .jmpdoe file). Other graphical user interfaces or views for a graphical user interface described herein will have save icons to indicate a user can save work for later user or exchange.

It should be noted, however, that not all embodiments need to have a save icon 902. For example, in one embodiment, the user is prompted as to whether the information input into the user interface should/should not be saved when the user closes the user interface. In such cases, the user could simply click either a "YES" or "NO" (or "SAVE" "CANCEL") control button, for example, to save or discard the information, respectively.

FIG. 9B shows an example of factor table 930 of a define view in guided usage mode. In FIG. 9B factors have been added to the factor table 930 for a paper helicopter experiment, where the experimenter wants to study the effect of different factors in creating a "helicopter" using a strip of paper and making various cuts and folds. The response is the time it takes for the helicopter to hit the ground when dropped from a certain height. The factors the experimenter is interested in are categorical factors of Leg Width with options Small, Medium, or Large, Paper Clip with options Yes or No, and Paper Type with options Heavy or Light; and continuous factors of Rotor Length with options between 2" to 6" and Leg Length with options between 3" to 4". Users can answer questions regarding the factors using the choice area 922 and factors representing these different options and natures are added to factor table 924. For instance, the choices can relate to the type of a factor in an experiment (e.g., whether a factor is a continuous or categorical factor). In this way, the choices can guide a user to adding factors.

In this example in FIG. 9B each of the choices for types of factors in the choice area 922 can have hints that can be shown by selecting the disclosure icon for further explanation (e.g., "Show Hint") to further provide user guidance. For instance, the choice "The factor can take any value between a low and a high level" could have a hint of "For example, the factor Temperature ranges between 30 and 50. For each run, the best level of this factor is determined by the computing system". As another example, the choice "The factor lies between a low and high value but can be set to user specified values" could have a hint of "For example, the factor Temperature has values of 30, 35, 40, 45, and 50.

The computing system determines the terms included in the model." As another example, the choice "The factor consists of a specified number of categories, groups, or kinds" could have a hint of "For example, the factor Fruit has values of Apple, Banana, or Kiwi". These hints can help guide a novice user through selecting a choice. In this example, the user has selected a choice 932 to add the last factor of Paper Type and specified 2 levels for this choice in the text box 926. In order to add the Leg Width factor and the Paper Clip factor, the user could also use this choice with 3 levels and 2 levels specified, respectively, in textbox 926. To add Rotor Length and Leg Length factors, the user could select choice 930. The user is also still able to add and remove factors directly to the factor table 924 using factor controls 928.

Figure 9A:
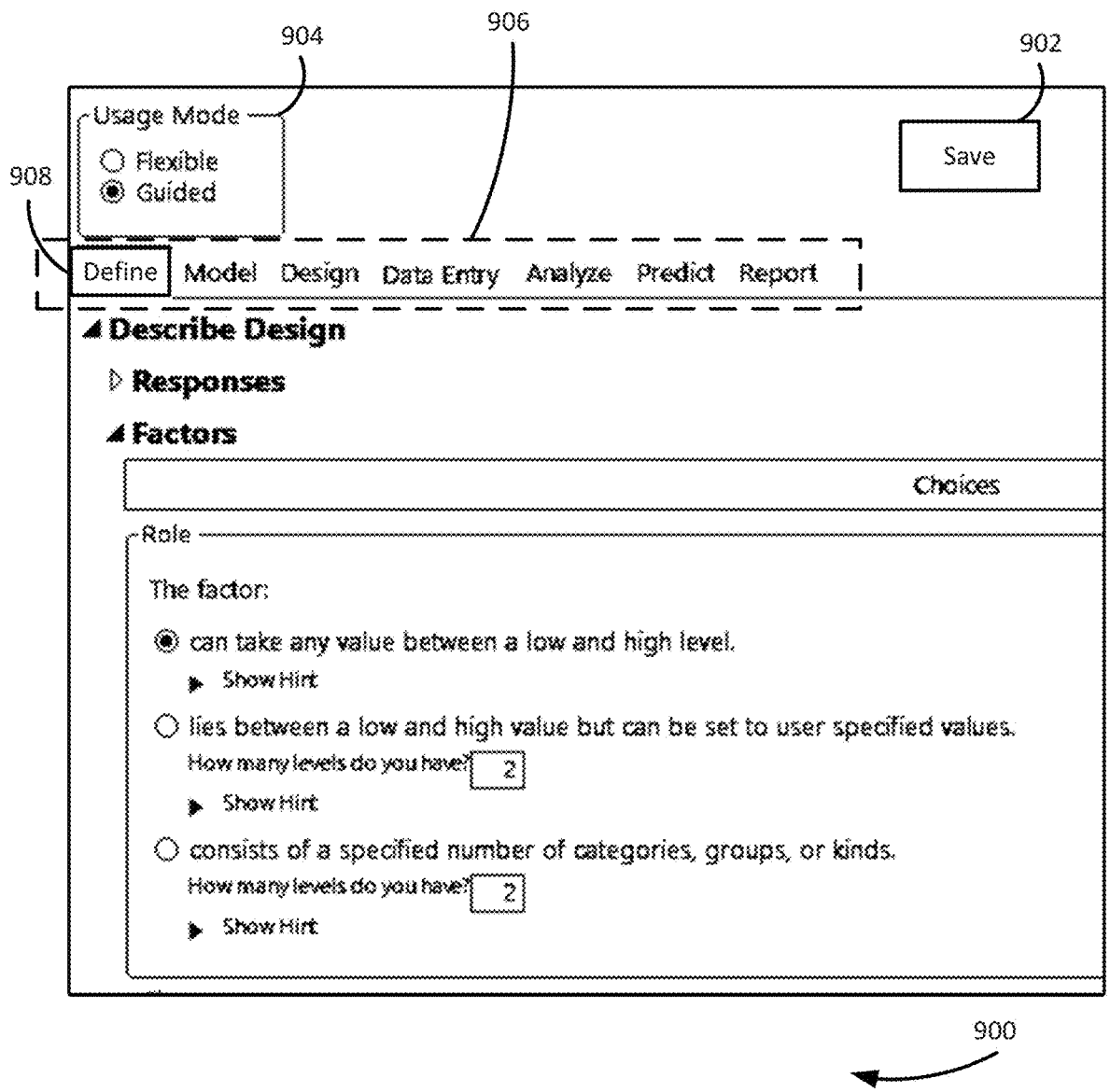
Figure 9C:
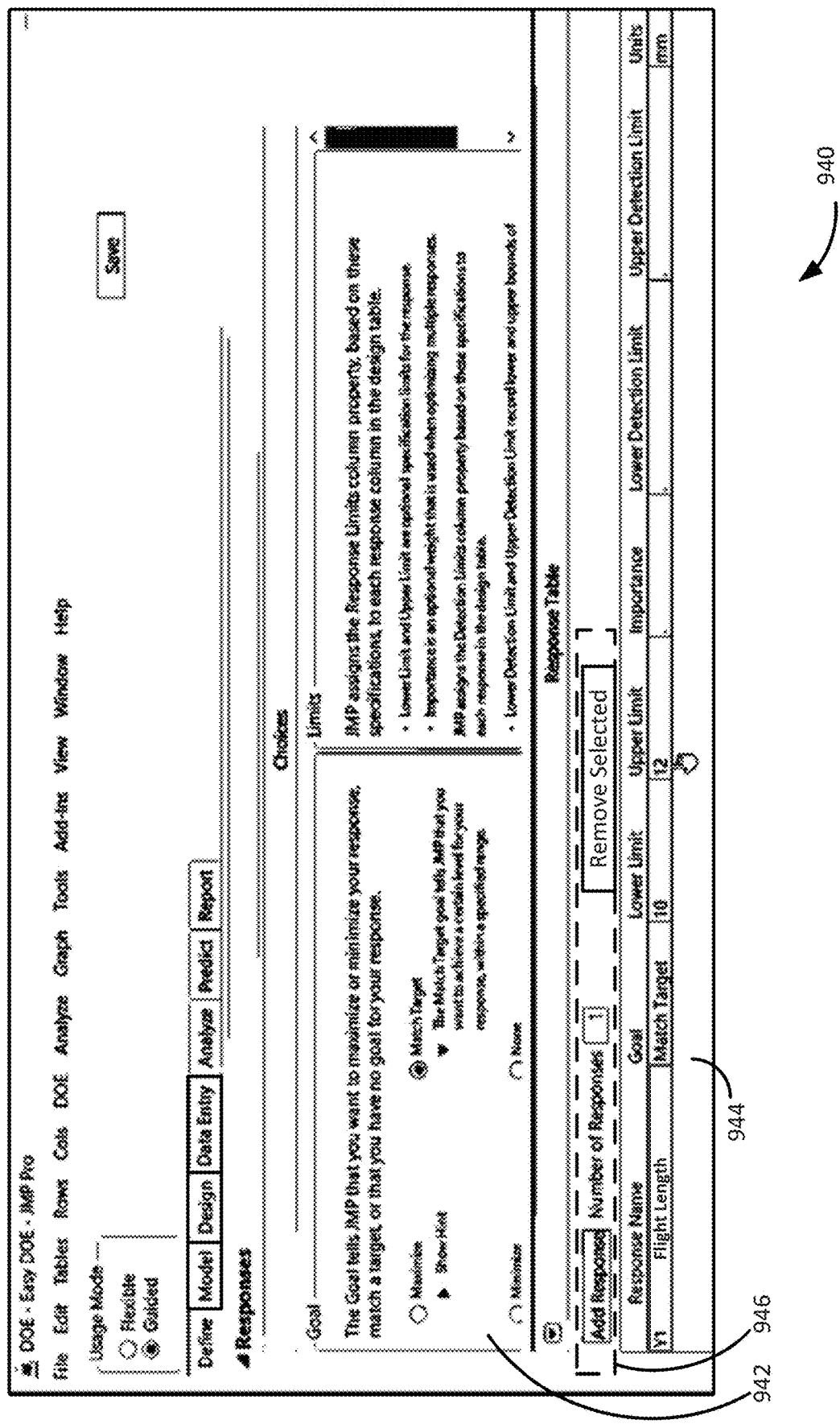

In FIG. 9C a graphical user interface 940 shows options for the user to select one or more goals for the responses in a guided usage mode (e.g., for the factors defined in FIG. 9B). For instance, the user-defined objectives can include one or more of maximizing, minimizing, or matching a target for a respective response in an experiment or a simulation of an experiment. For instance, in this case the user has used the goal section 942 to select "match target", and the response area 944 shows a goal of match target for the response for a response of Flight Length. The user can also add and remove responses and goals from response area 944 using the response controls 946.

Figure 9D:
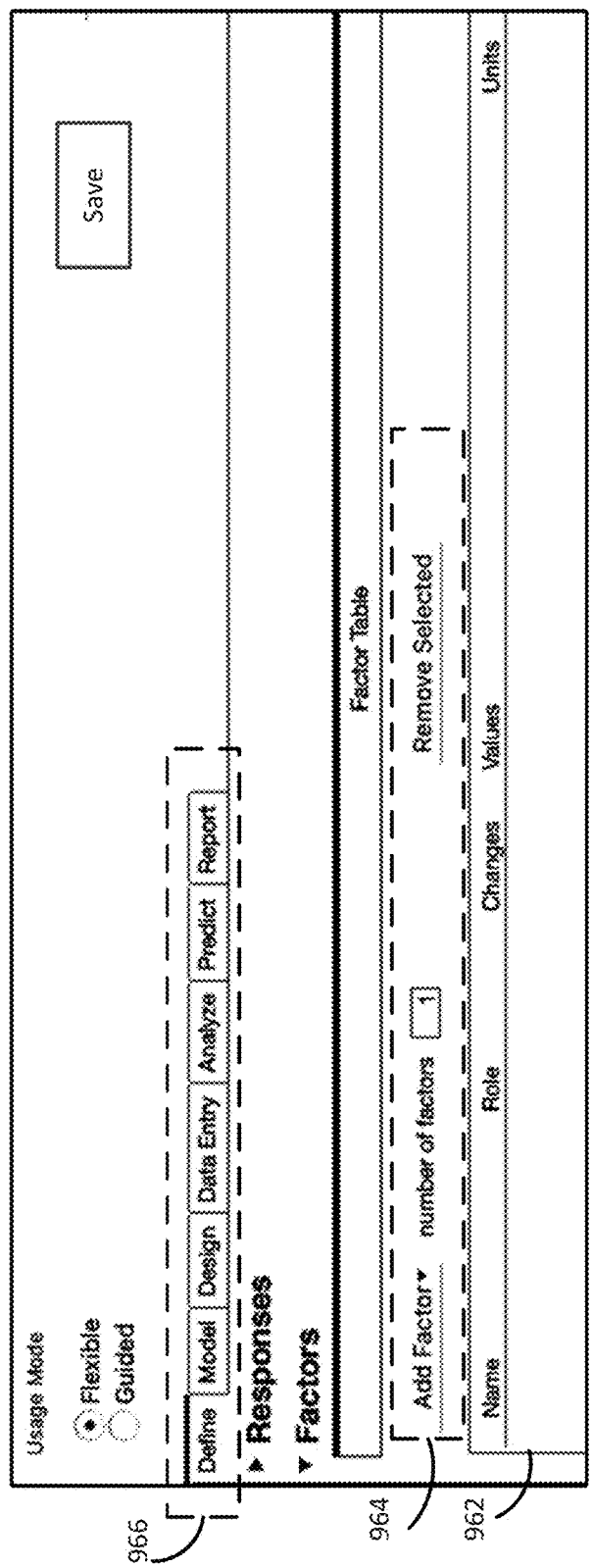
Figure 9E:
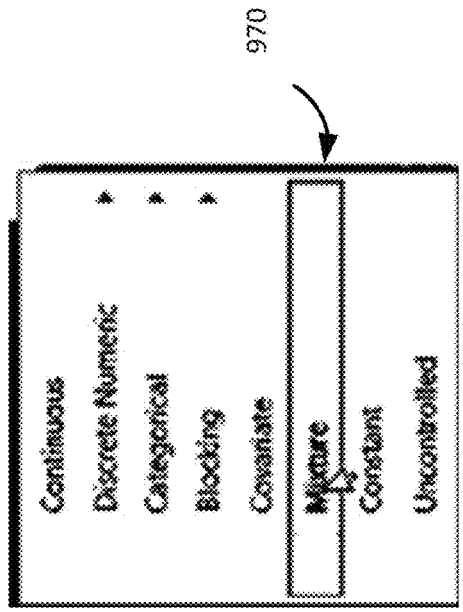

In both guided usage mode and flexible usage mode, a user can manually add factors and responses without being guided or prompted by the user interface, such as by the controls provided in the choices panel 922 of FIG. 9B. For instance, FIG. 9D shows graphical user interface 960 without such guides or prompts for a factor table 962. Factor controls 964 can be used to add and remove factors from the factor table 962. The user can also have more options for specifying aspects of the factors. For instance, FIG. 9E shows additional type options 970 that can be specified in the flexible usage mode beyond what the guides or prompts would have identified in choices panel 922 in FIG. 9B. Type options 970 show factor types of continuous, discrete numeric, categorical, blocking, covariate, mixture, constant, and uncontrolled. If the user were to switch back to guided usage mode one or more possible factor types could be excluded to simplify factors in the design of the experiment (e.g., only allowing continuous and categorical factor types in guided usage mode).

Regardless of the mode, navigation controls allow the user to move through a design of experiment workflow (e.g., in a sequential manner or in any order or direction). For instance, the user can select different tabs in the tabs area 966. In one or more embodiments, a computing system can restrict how the user can move through a workflow. For example, a computing system can restrict a user from moving to an "Analyze" tab if data was not entered on the "Data Entry" tab. The system can guard against invalid transitions between usage modes (e.g., prompting a user as to what role options 970 in FIG. 9E may be lost or converted to another role option if the user switches from flexible to guided usage mode).

Figures 9F, 9G:

For instance, as shown in FIG. 9F, the user is using a control 980 to select factors to load into a factor area in guided usage mode. The user is selecting a "Block" factor, which would in a flexible usage mode have a factor type or role of "Blocking". FIG. 9G shows a graphical user interface 990 after the selected factors are loaded into the factor area 992 (e.g., using the "Add Factor" control 994). The computing system has looked at the options for the "Block" factor and converted the "Block" factor to a role acceptable and appropriate for the options. In this example that role is categorical. In other embodiments, the computing system can receive one or more factor identities by receiving them in a flexible usage mode of multiple modes, which would preserve their factor types. The user can switch to the guided usage mode that restricts one or more options for user input available in the flexible usage mode and the computing system can generate a computer correction to the user input based on restricted options for the user input in the guided usage mode (e.g., changing the role as in this case).

The original user input, or computer corrected input, can be used for displaying model types or a subset of model types. For instance, design heuristics can be applied by a computing system to a transition between a Define tab (e.g., appearing in graphical user interface 990 of FIG. 9G) and a Model tab described in more detail with respect to FIGS. 10A-10C. Design heuristics can determine the content of the Model tab and, as a result, determine other tab content such as the design presented at the Design tab. Examples of some design heuristics between the model and define tabs for a guided usage mode are seen in FIG. 11A. For a flexible usage mode, the design heuristics would be one or more rules specifying whether a Definitive Screening Design (DSD) is or is not feasible. For example, in Flexible usage mode, consider a situation where a response surface model is specified. In such instances, an I-optimal design may be created. Otherwise, an A-optimal design may be created. However, in some cases in the Flexible usage mode, a D-optimal design may be created for a main effects model and 2-level factors in lieu of an A-optimal design. As another example, for guided usage mode, for four (4) or fewer continuous factors or two-level categorical factors, an alias optimal design will be created, while for five (5) or more of those same factor types, a DSD is generated. If factors are specified with more than two (2) levels, the option is not available to the user.

Figure 10A:
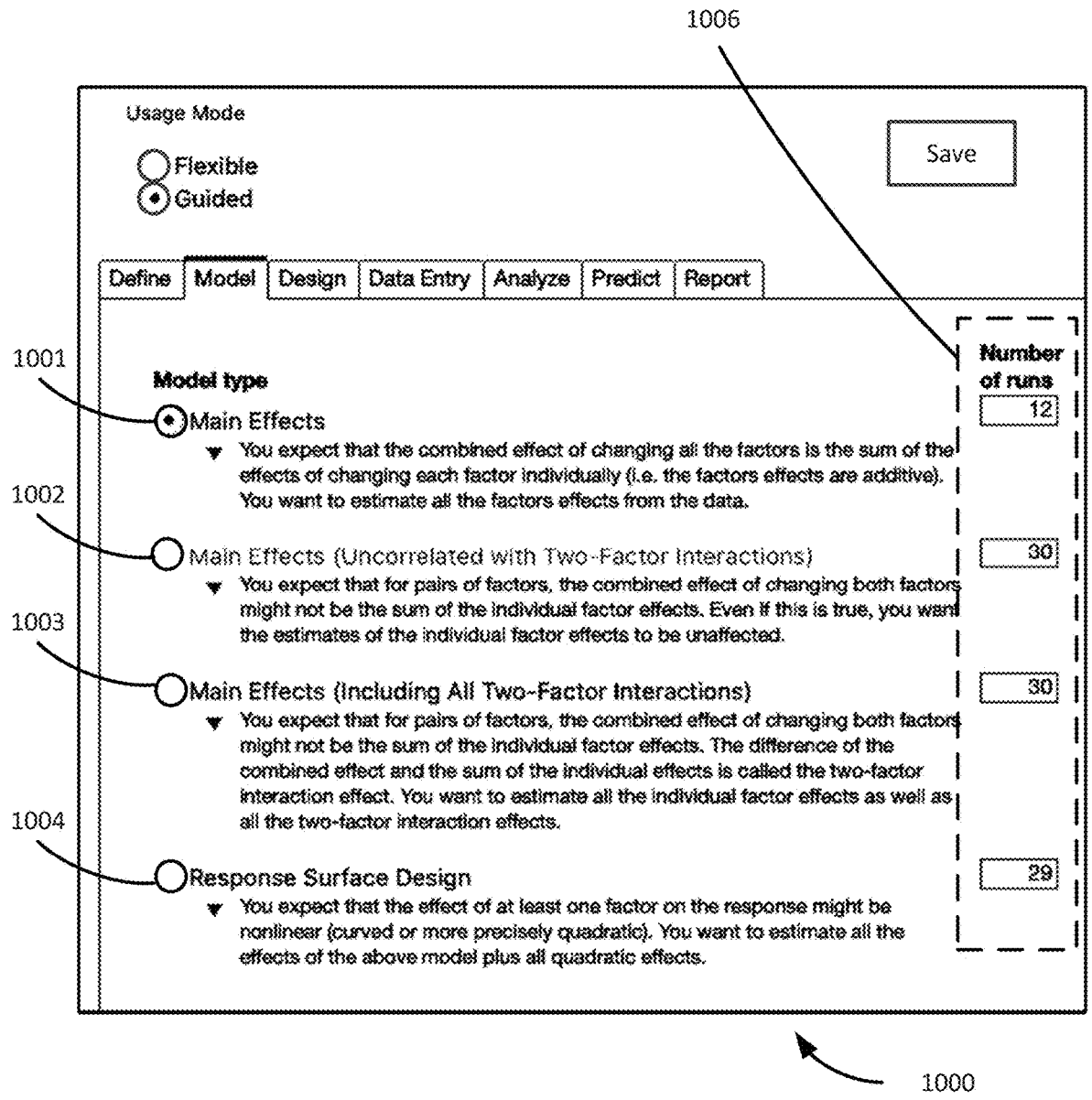
Figure 10B:
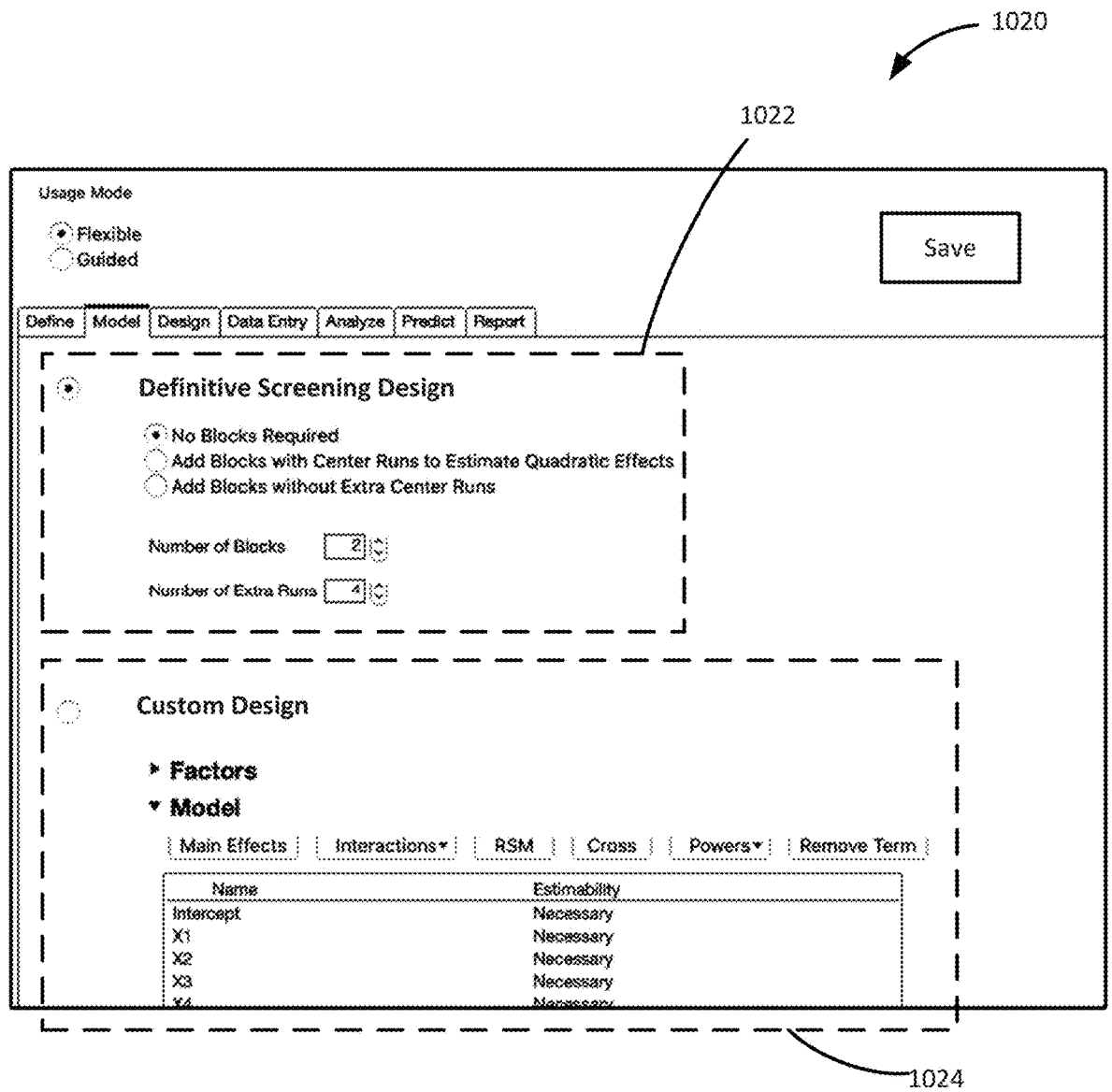
Figure 10C:
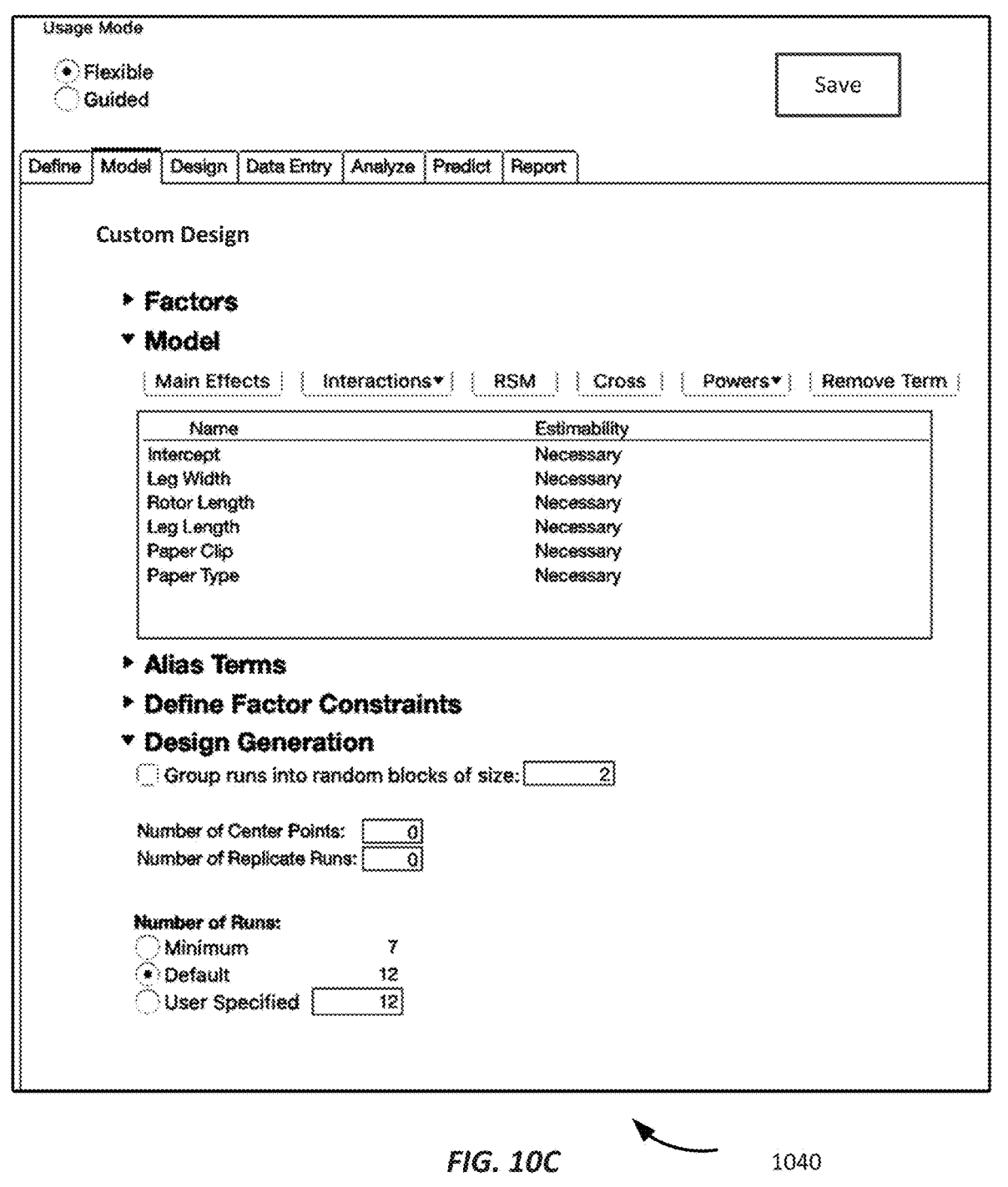

FIGS. 10A-10C illustrate an example graphical user interface for generating a model for a design of an experiment. In the example in FIG. 10A, the graphical user interface 1000 is in a guided usage mode which provides options (e.g., radio buttons) for a user to choose their model type and the number of runs. Additional or alternative information could be displayed to help guide user choices (e.g., a minimum run size for each choice).

In this example, the model tab in the guided usage mode displays a subset of multiple model types. The model types can include one or more main effect model types (e.g., subset including model type 1001, model type 1002, and model type 1003), one or more interaction model types (e.g., subset including model type 1002 and model type 1003), and one or more response surface design model types (e.g., subset including model type 1004).

The computing system can generate a subset of the multiple model types set by excluding, based on the factor types, at least one of the main effect model types, interaction model types, and response surface design model types. For instance, in this case the computing system has grayed out model type 1002. In alternative examples, this option may be enabled such as if the factors were all continuous and two-level categorical then this option could have been enabled. For example, the model tab of the graphical user interface 1000 could offer the user a choice from four classes of models and recommend a run size for each. The classes in this example are: Main Effects, Main Effects, uncorrelated with two factor interactions (2FI), Main Effects, including all 2FI, and Response Surface Design.

As shown in this example, a computing system can store an amount of design runs for each subset of the set of multiple model types and display a suggested amount of runs by each of the model types for generating a design. The suggested runs can be user-definable in that the user can accept or define a different amount of runs for the design. For instance, in this example, the textboxes 1006 are editable for the computing system to receive a user-defined amount of design runs by receiving a unique amount of runs different than the respective stored amount of design runs for a selected model type (e.g., the ones displayed in the textboxes 1006). The computing system can then generate a model based on a design according to the user-defined amount of design runs. Because of the flexibility of design platforms, designs for these model types can be created dynamically (e.g., based on a flexible number of runs) and need not be stored ahead of time.

Model types can be provided rather than specific pre-configured designs because the Guided usage mode can use one or more design platforms (e.g., a Custom Design platform). The computing system does not need to force a user to pick from only a small subset of pre-configured designs. For example, FIG. 10B shows options 1022 in a flexible usage mode for a DSD and options 1024 for a Custom Design as example design platforms. A screening design can be helpful for generating designs to identify factors that have the most substantial effect on a response. For example, the options 1022 relate to adding blocks which are factors that should not have an affect on the outcome of an experiment but may. For instance, if a design is for an experiment using a material in the experiment from different sources the quality of that material should not but may differ from the different sources so a blocking factor for source may be added to the model. Custom Design platforms tend to create flexible special purpose designs, so the options 1024 could relate to many aspects of the design such as factors and the model. These two design platforms are shown as an example. Other design platforms could include, for example, response surface design platforms, factorial design platforms, mixture design platforms, and split-plot design platforms. These platforms could have their own set of options relevant to the design.

In one or more embodiments, a computing system can use heuristics to determine appropriate choices (e.g., relevant design platforms) for the user as the user steps through a workflow even in a flexible usage mode. For instance, FIG. 10B shows a model tab of a graphical user interface 1020 providing different options for available platforms in a flexible use mode for more direct control over model and design development (e.g., options for a definitive screen design and options for a custom design). If instead the user made selections in the guided usage mode in FIG. 10A, the computing system may constrain the design platform available. For example, if a DSD is not appropriate for the specified factors, then the DSD option may not be offered as shown in the graphical user interface 1040 of FIG. 10C. For instance, the computing system can use heuristics to determine appropriate choices for the user as the user steps through a workflow and the heuristics used can be tailored to a usage mode. The computing system can easily allow the user to make choices and shift back and forth easily between the different modes while considering a user's choices made in different modes. For instance, if a user realizing that the options selected in the guided usage mode would restrict the design platforms (e.g., shown in FIG. 10C) the user can make different choices in the guided usage mode so that the graphical user interface will display options for a design platform that are restricted in a guided usage mode (e.g., DSD). Further, the complete user interface of the different design platforms can be presented within the model tab for user control over the designers available.

FIG. 11A illustrates a table 1100 of example computing logic for selecting design construction criteria. For instance, a computing system can select one or more design construction criteria by selecting a design platform from multiple algorithmic construction platforms for generating the design. For example, the computing system can use design heuristics to examine the factors specified at the Define tab and/or the model selected and determine for each class of design, the designer that is most appropriate for construction. In this example, the model column 1101 shows available model types and available designers in designer column 1102. For simplicity, the available designers shown are the DSD and Custom Design platforms. Other platforms could be provided and/or other criteria. For instance, field 1104 could be used for the computing system to select DSD if the factors are continuous or categorical AND there are at least 5 factors AND there are no more than 3 categorical factors AND the number of categorical factors is no more than the number of continuous factors AND all factors have two levels. Otherwise, the computing system could select Custom Design.

Additionally, or alternatively, the computing system can select one or more design construction criteria by selecting an optimality criterion for the design of the experiment from multiple optimality criterion (e.g., I-optimal, D-optimal, and Alias-optimal). For example, the computing system can use design heuristics to examine the factors specified at the define tab and/or the model selected and determine for each class of design, the optimality criterion to be used for construction (e.g., when a Custom Design platform is the designer). An example optimality criterion is shown parenthetically beside the Custom Design option in the Designer tab.

For example, an I-optimality criterion can be used to generate an I-optimal design that minimizes the average variance of prediction over a design space over available design options. I-optimality would be for a response surface. An Alias-optimality criterion can be used to generate an Alias optimal design that seeks to minimize, from available design options, the aliasing between effects that are in a model and effects that are not in the model but are potentially active. Alias-optimality would be for uncorrelated choices. A D-optimality criterion minimizes the determinant of the covariance matrix of the model coefficient estimates. D-Efficiency is the efficiency of the design to that of an ideal or hypothetical orthogonal design in terms of the D-optimality criterion. D-optimality is optimal for main effects/main effects and interactions when it is needed to determine important model terms, A design is D-optimal if it minimizes the volume of the joint confidence region for the vector of regression coefficients according to equation (1):

$$D\text{-Efficiency} = 100\left(\frac{1}{n}|X'X|^{\frac{1}{p}}\right) \quad (1)$$

where X is the model matrix, n is the number of runs in the design and p is the number of terms, including the intercept, in the model. Other optimality criterion could be selected for designs than shown in this example (e.g., A-optimality, G-optimality, etc.).

As shown in table 1100, the computing system can use rule-based computer instructions to select multiple design construction criteria for generating the design of the experiment (e.g., both optimality criterion and design platform). Different or additional computing decisions can be made than shown in this table 1100. For instance, the computing system can use design heuristics to examine the factors specified at the Define tab and/or the model selected and determine for each class of design, a recommended run size. The minimum possible run size can also be determined (e.g., as a lower bound to limit the run size that the user can specify). A maximum run size (e.g., a multiple of the recommended run size) can be used to limit what the user can specify.

FIG. 11B illustrates an example graphical user interface 1150 for generating a design for an experiment. In this example, the graphical user interface 1150 is in a guided usage mode and the design cases for the design are shown in the table 1152. These design cases show options selected for each of a series of runs of the experiment. In this case, the experiment can be run 12 times according to the design.

A design evaluation area 1154 gives user options for exploring the design. Both Guided and Flexible usage mode can show the design with design diagnostics underneath. Which design diagnostics are offered and how they are presented may be adjusted given the mode or could be the same under different modes.

Figure 12B:
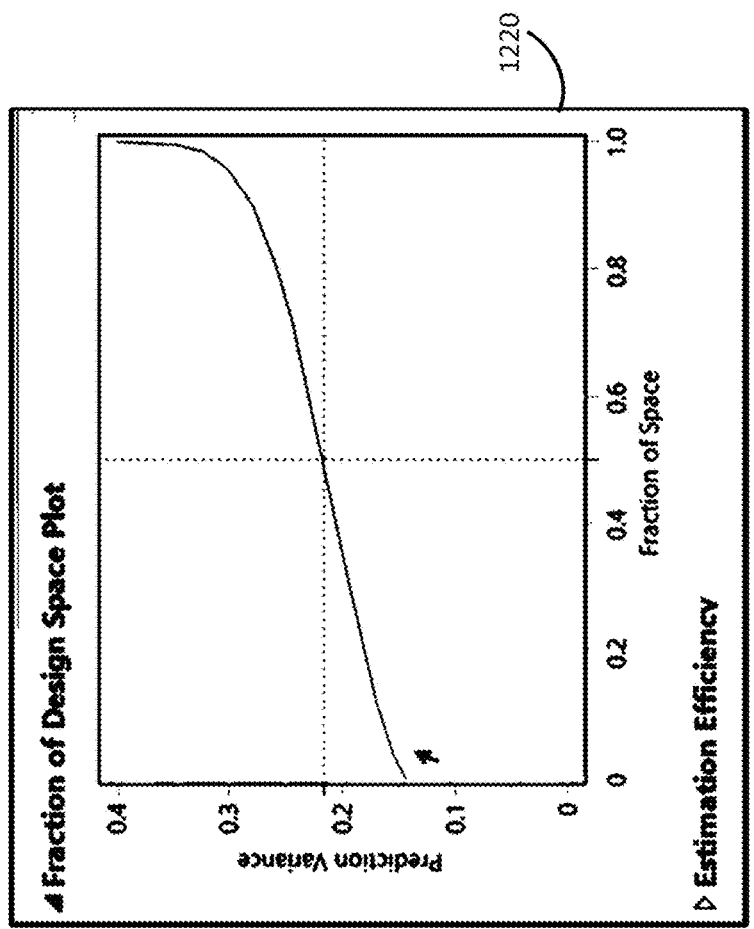
Figure 12A:
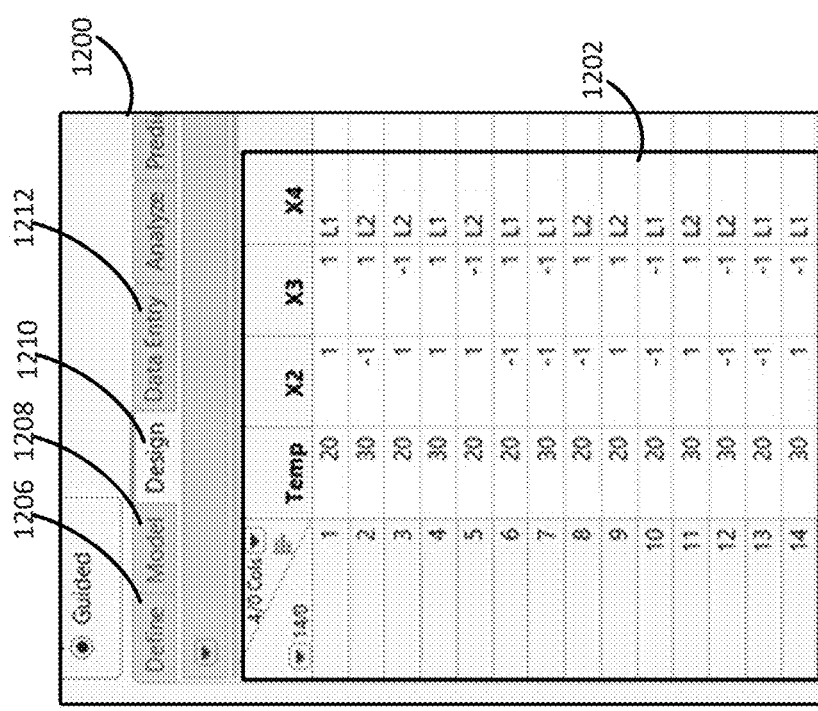

FIGS. 12A-12C illustrate an example graphical user interface 1200 in a design view according to design tab 1210 for evaluating a design 1202 for an experiment. The user has provided input indicating 3 continuous factors (Temp, X2, X3) and one categorical factor with two levels (X4) (e.g., using a define tab 1206). The user had also selected a main effects model with 14 runs (e.g., using a model tab 1208). In response, the computing system, using the computer logic in table 1100 of FIG. 11A, employed a Custom Design platform to create a D-optimal design having 3 continuous factors and one categorical factor with two levels.

Evaluation options are shown in the design evaluation area 1204 (e.g., Fraction of Design Space Plot, Estimation Efficiency, Alias Matrix, and Design Diagnostics). FIG. 12B shows an example view 1220 of a Fraction of Design Space Plot that graphs prediction variance as a function of fraction of design space for the design 1202. FIG. 12C shows an example view 1240 of metrics as part of Estimation Efficiency, Alias Matrix and Design Diagnostics for the design 1202. As shown the D-Efficiency is very close to 100 (maximum D-efficiency) at 98.45986 in response to designing for a D-optimal criterion. The user can use this information to evaluate the design and possibly make changes to the design (e.g., the number of runs selected or the amount of factors) within the same graphical user interface (e.g., using define tab 1206 and model tab 1208). Or the user can use the design to generate responses on the data entry tab 1212.

Figure 13B:
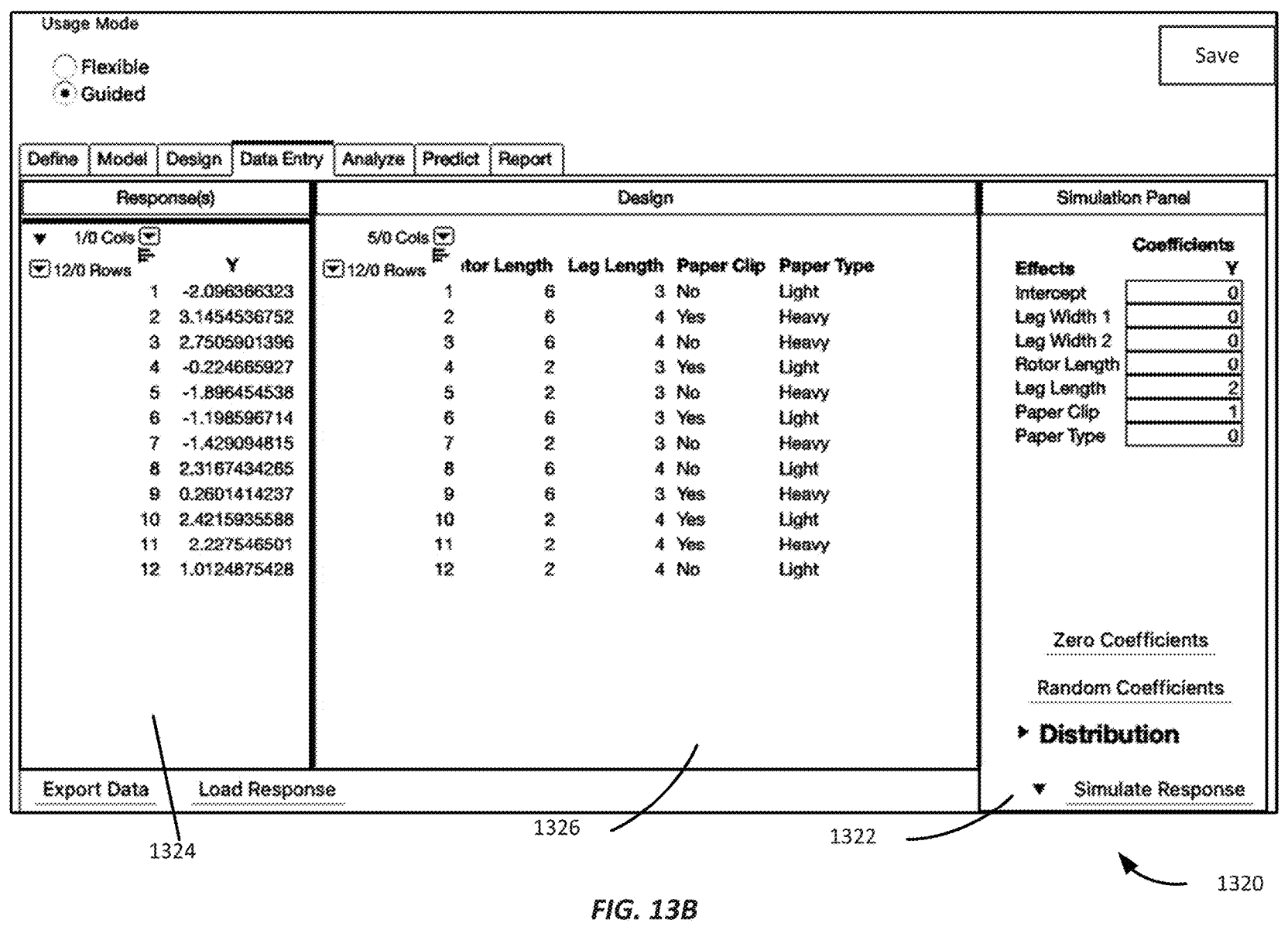

FIGS. 13A-13B illustrate an example graphical user interface in a guided usage mode for obtaining responses for a design for an experiment. For instance, a user can use the data entry view 1300 to enter observed values in the response area 1302 for the response from an experiment or simulation of an experiment according to a design in design area 1304. The user has several options for entering responses. For instance, data can be entered manually (e.g., by typing into response area 1302), loaded from an external file (e.g., using load response control 1308), or synthesized using the simulation feature (e.g., using simulation control 1306). This example is in a guided usage mode. In some examples, both modes offer response simulation, but flexible usage mode has the simulation panel open by default or may have more options for user control of the simulation. FIG. 13B shows a graphical user interface that has a view 1320 with the simulation panel 1322 open. The graphical user interface displays a design of an experiment in design area 1326. The simulation panel 1322 presents options for the user to select for simulating the design of the experiment. The computing system generates data for one or more responses based on simulating the design. For example, the simulation according to the simulation panel 1322 generated the responses in the response area 1324 from the design in the design area 1326. Accordingly, a user can simulate a design using a graphical user interface used to generate the design.

Figure 14:
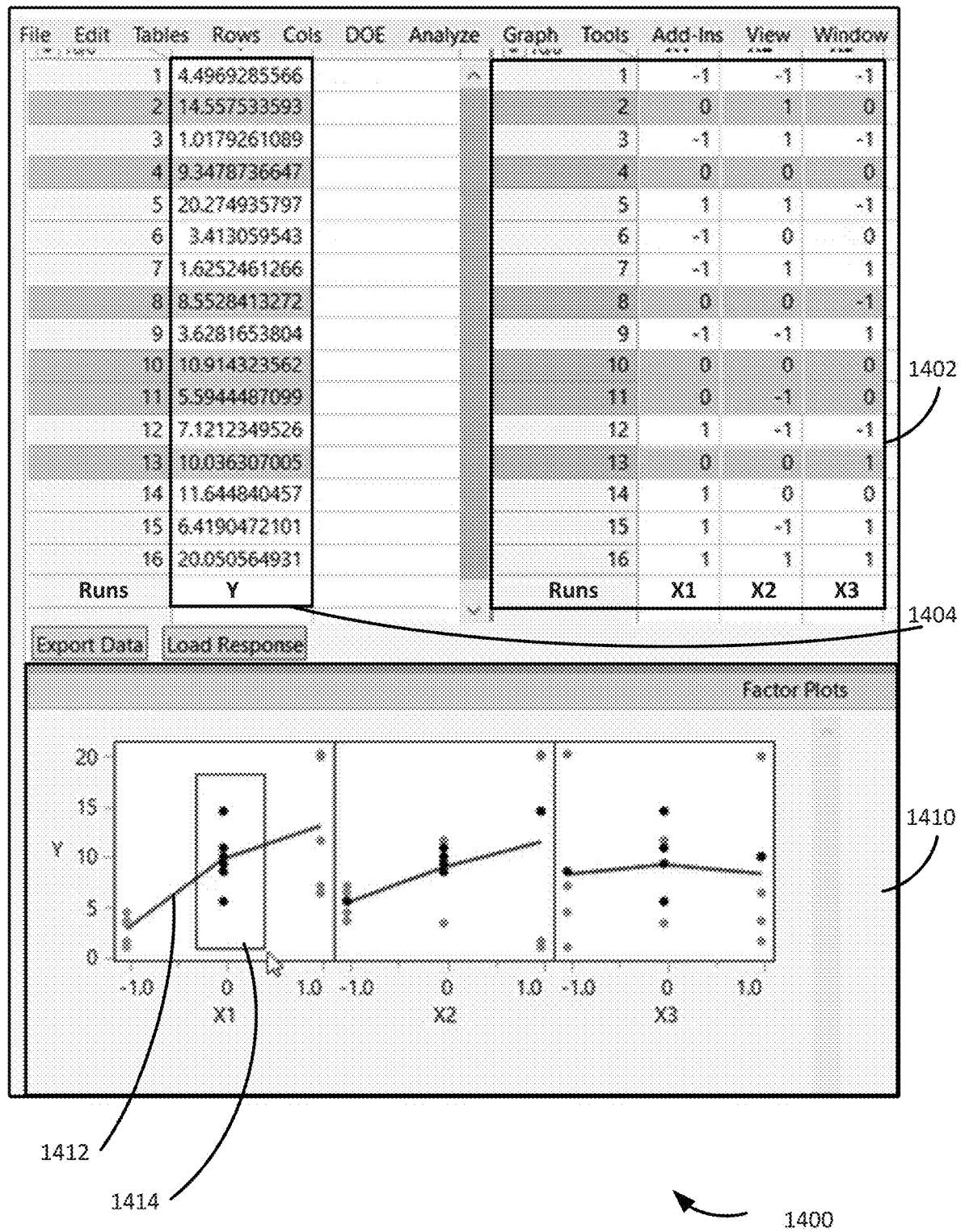
FIG. 14 illustrates an example graphical user interface for evaluating responses for a design for an experiment according to at least one embodiment of the present technology.

FIG. 14 illustrates an example graphical user interface 1400 for evaluating responses for a design for an experiment. In this example, the model type selected was a response surface design for 3 factors (X1-X3). A design 1402 of an experiment is displayed in the graphical user interface 1400. The design 1402 was generated using a Custom Design platform with I-optimality according to the computing logic shown in FIG. 11A. Sample responses are shown in response column 1404. Graphical Representations (e.g., Factor Plots 1410 below the design) can be used to analyze the data and its responses. For instance, for each factor the output (Y) is plotted with a predictive model curve shown (e.g., model curve 1412).

Graphical representations and designs shown herein can be interactive. For example, as shown the user selected certain data points using selection box 1414 in Factor Plots 1410. The displayed design 1402 is then updated to have those selected data points highlighted within response column 1404 and design 1402. Additionally, or alternatively, design points could be selected within the design 1402 or response column 1404 and design points highlighted within Factor Plots 1410. This interactivity could allow, for example, for a user to remove or add test cases to adjust a generated model or predictive model curve.

Figure 15A:
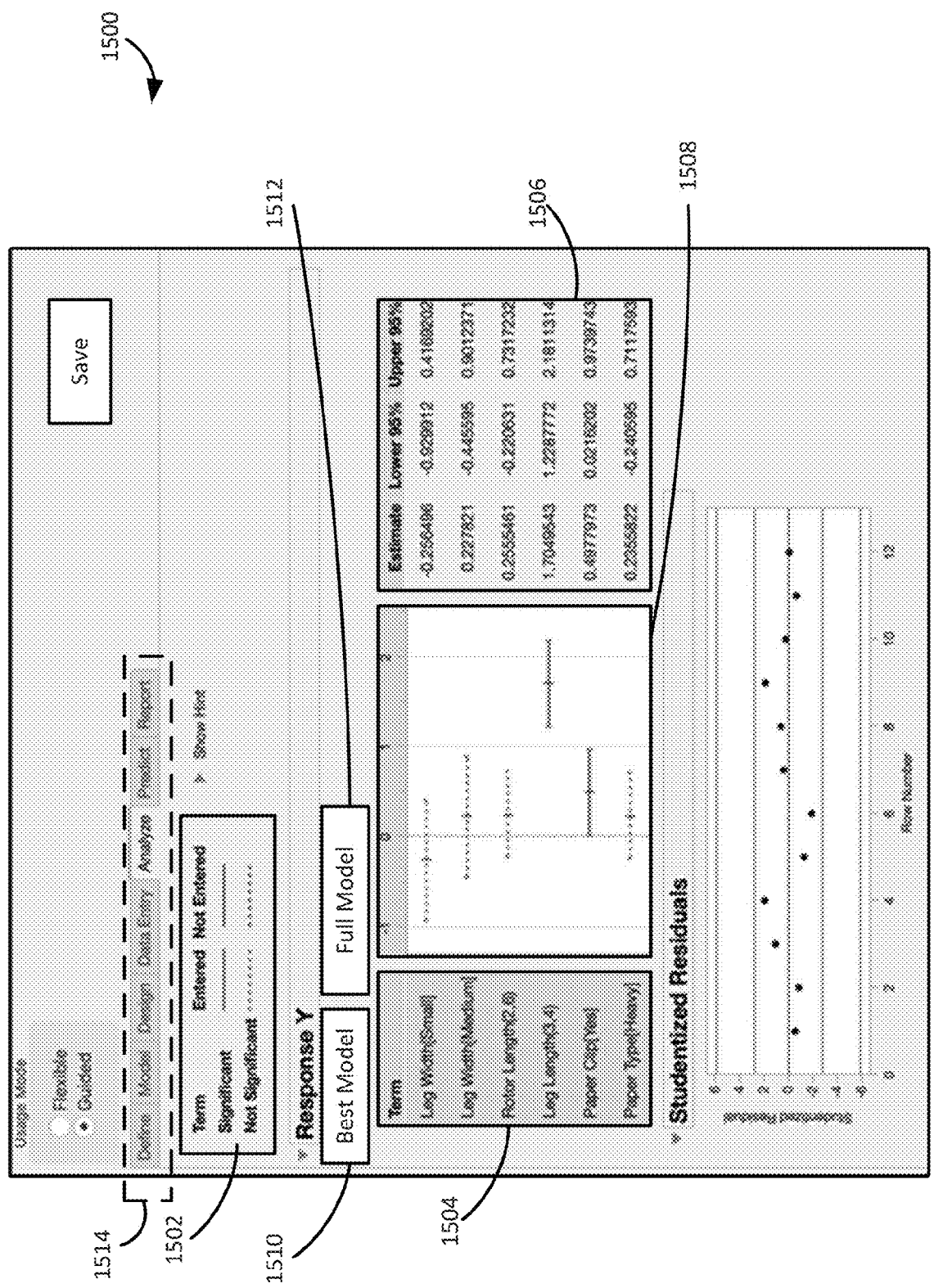
FIGS. 15A-15C illustrate example graphical user interfaces for analyzing a model for a design for an experiment in a guided usage mode according to at least one embodiment of the present technology.
Figure 15B:
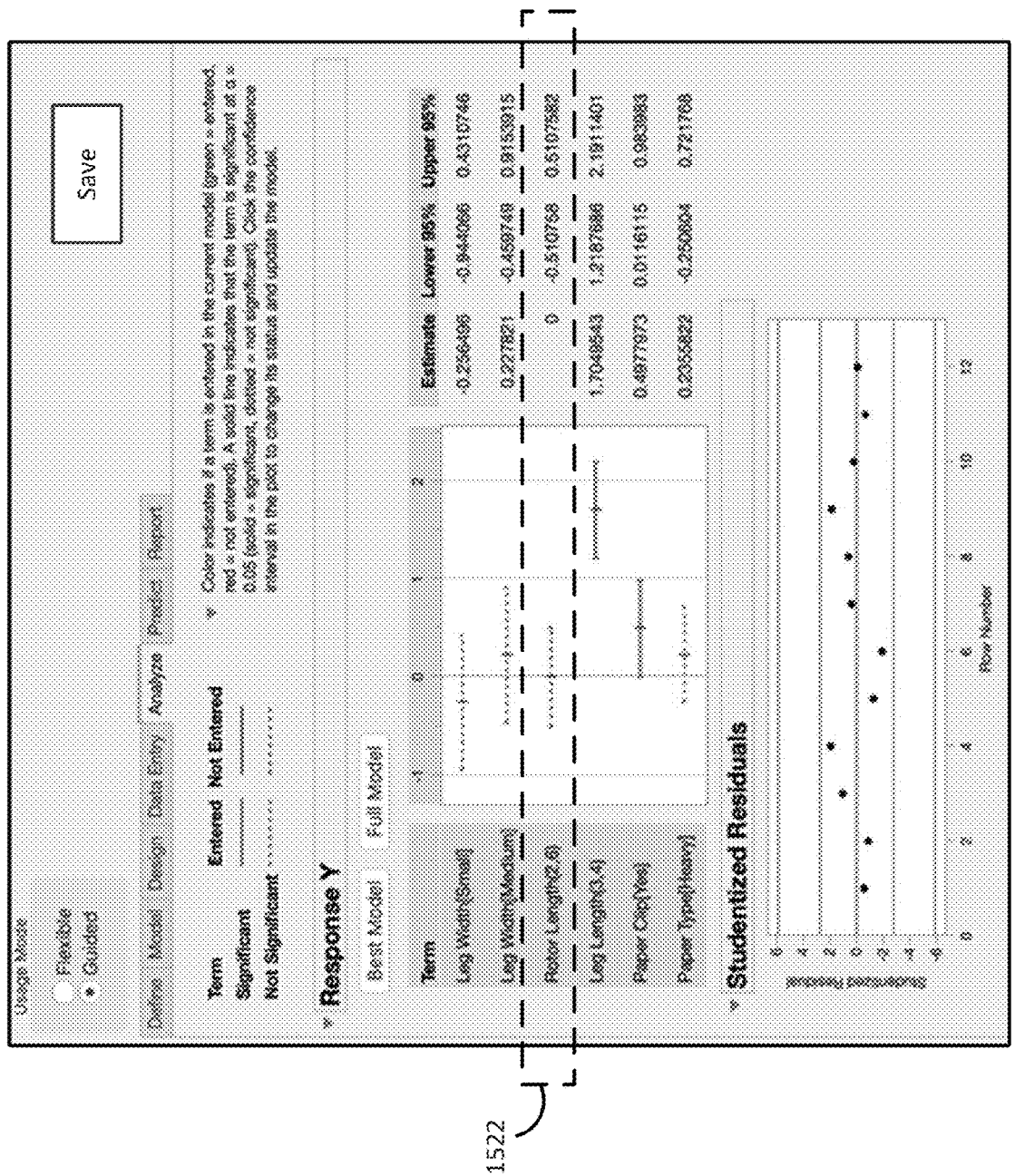

One or more embodiments advantageously also allow a user to analyze a model in the same graphical user interface as one used to generate a model and/or design. FIGS. 15A-15B illustrate an example graphical user interface for analyzing a model for a design for an experiment in a guided usage mode. The graphical user interface 1500 of FIG. 15A has tabs 1514 as described with respect to other examples. For instance, a define table can be used to receive user input indicating respective factor identities for multiple factors in the design of the experiment (e.g., leg width, rotor length, leg length, paper clip, paper type, etc.). A data entry tab could be used to obtain data for the one or more responses (e.g., using techniques described with respect to FIGS. 13A-13B). A model could be generated based on selections made on the tabs 1514 (e.g., based on the design and/or the obtained data). In this example, the computing system displays on an analyze tab an interactive graphical representation of model terms (e.g., chart 1508).

The guided usage mode allows for selectable aspects of graphical user interface 1500 (e.g., selecting individual values in confidence intervals 1506, selecting individual terms in terms 1504, and/or selecting aspects of chart 1508). For instance, a user can select aspects to add or remove terms. An interactive graphical representation (e.g., chart 1508) shows if terms are in the current model such as an inclusion status (e.g., green terms are included, and red lines would indicate excluded terms according to the key 1502). Additionally, or alternatively, the graphical representation indicates, for each of the model terms, a respective significance of terms to the model (e.g., solid versus dotted lines to distinguish significance according to the key 1502). The chart 1508 in this example represents a novel interactive chart that shows inclusion status of model terms with computer-evaluated indications term significance to a model.

In one or more embodiments, the guided usage mode can also provide selectable options for providing computer-generated suggestions for included and excluded model terms. For instance, graphical user interface 1500 shows a "Best Model" control 1510. This control could use, for example, a Fit Model platform to use stepwise personality to identify model terms to exclude and exclude. As another example, the control 1510 can be dependent on the design platform. For example, if the design is a definitive screen design, then the Definitive Screening Design tool can be used to select terms. If the Custom Design tool is used, the Fit Stepwise tool with the Akaike's Information Criterion (AICc) stopping rule can be used to select terms. Alternatively or additionally, terms determined to be "not significant" according to the computing system could be excluded. A "Full Model" control 1512 easily returns all terms to the model, which may be helpful in situations in which the user is experimenting with excluding terms.

In one or more embodiments, a computing system receives a user modification of an interactive graphical representation (e.g., chart 1508) indicating a model term to exclude; and updates the model and the interactive graphical representation based on the user modification. For instance, FIG. 15B shows an example of a graphical user interface 1520 at a different time point than the graphical user interface 1500 in FIG. 15A. At this time point, the user has selected the Rotor Length factor 1522 to remove it from the model. Rotor Length factor 1522 is red in response to the user input. The graphical user interface 1520 is interactive so the user can keep making adjustments to the terms. For instance, the computing system can receive a user modification of the interactive graphical representation indicating a model term to include (e.g., to toggle the Rotor Length factor 1522 back to green). The computing system can update the model and the interactive graphical representation based on the user modification. For instance, the Rotor Length factor 1522 can turn back to green and the model will be updated to include this term.

Figure 15C:
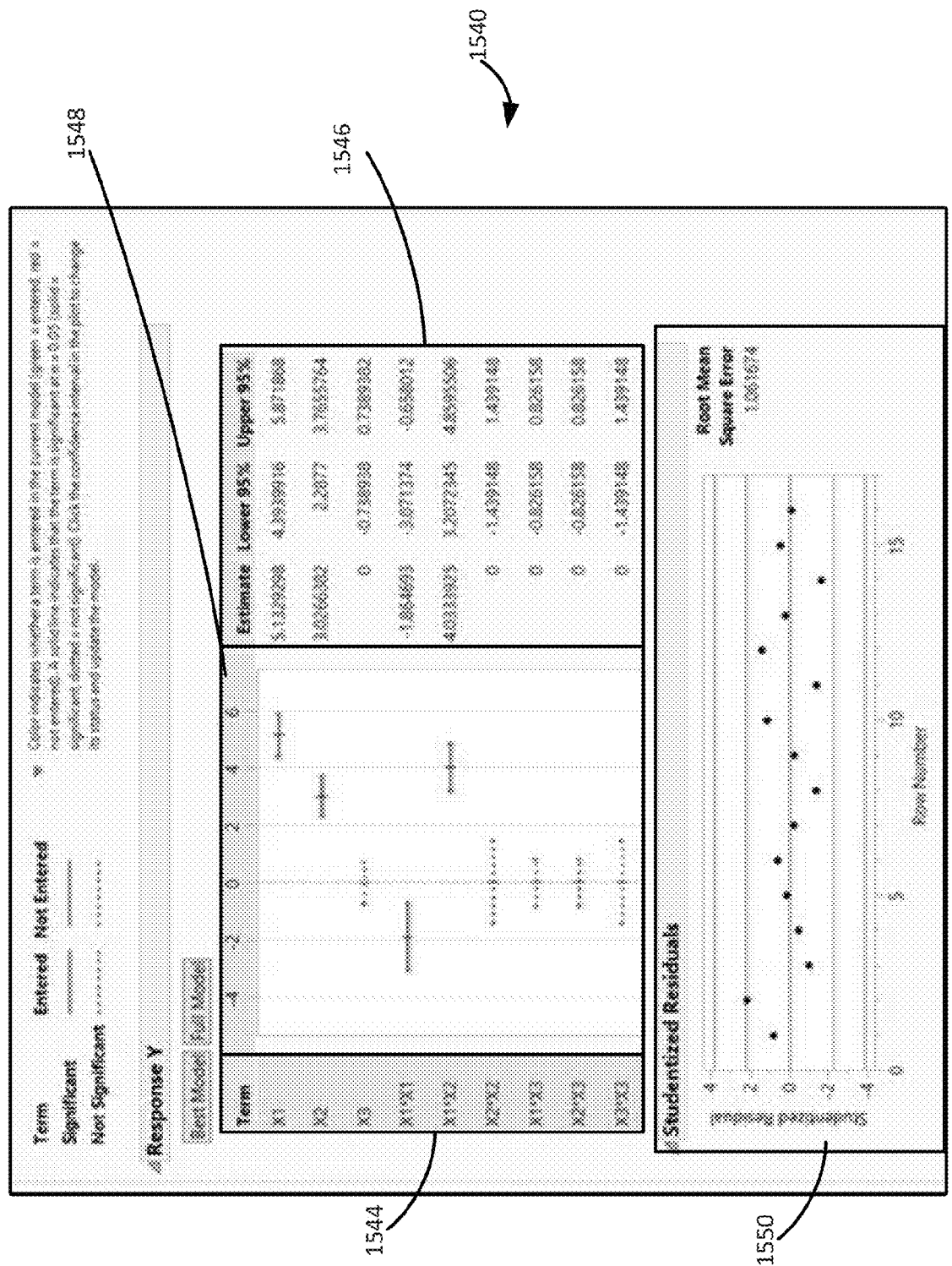

In one or more embodiments, a computing system can also consider in guided usage mode the interactions between factors when it receives user input indicating multiple factors in the design of the experiment. FIG. 15C shows example graphical user interface 1540 in which there are factors X1-X3 in the design of the experiment. There are candidate terms 1544 for generating a model that include interaction terms (e.g., X1*X2 included in this example and X1*X3 excluded in this example). The user can use the graphical representation 1548 to include and exclude terms. The computing system can update the model and the interactive graphical representation based on the user modification to the interactive graphical representation 1548. The graphical representation 1548 also shows the significance of model terms to the model for user consideration.

A computing system can generate an analysis of a model in a guided usage mode for the graphical user interface. For instance, metrics and graphs can be displayed in a graphical user interface to guide a user to understanding the fit of the model and the contribution of individual model terms. For example, graphical user interface 1540 also includes metrics table 1546 regarding individual model terms (e.g., estimates of the model term and confidence intervals). Graph 1550 shows a studentized residuals graph which can be helpful for identifying outliers that may be pulling on model outcomes. Accordingly, a computing system can generate a first model based on a design generated by the computing system and a user can use the graphical user interface to assess that model and control its development. However, a guided usage mode may be configured to restrict user control of model construction. A user may wish to switch from a guided usage mode to a flexible usage mode in the graphical user interface. FIG. 16A shows a graphical user interface 1600 in which the user has switched to a flexible usage mode.

FIGS. 16A-16E illustrate additional analysis criteria than displayed in the guided usage mode for analyzing a model for a design for an experiment in a flexible usage mode with the three factors shown in FIG. 15C. In this example flexible usage mode, users access a generalized regression platform and its greater choices for model selection (e.g., choices shown in FIGS. 16A-16E). This advantageously is done in the same platform as the design creation, and does not require the user to create a data table and launch that platform. For instance, the platform can start by default with the full model and/or other default choices for model analysis. In this example, the default choices included using a Fit Least Squares tool and was best subset using Akaike's Information Criterion (AICc), but can adapt depending on the scenario (e.g., different default choices for different experiments or designs). For example, if the design contains whole plots or sub-plots, the Fit Model, Mixed Model personality may be used for fitting. A complete user interface of the fitting tool can be presented to the user for greater user control.

Figure 16D:
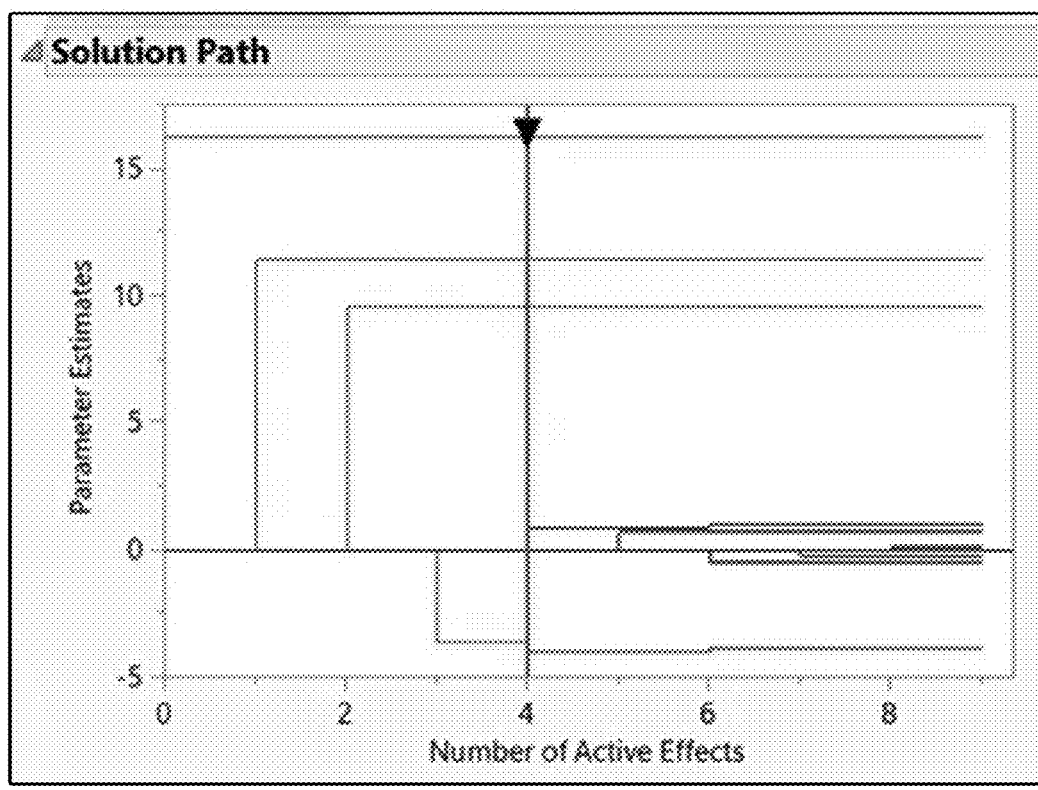
Figure 16E:
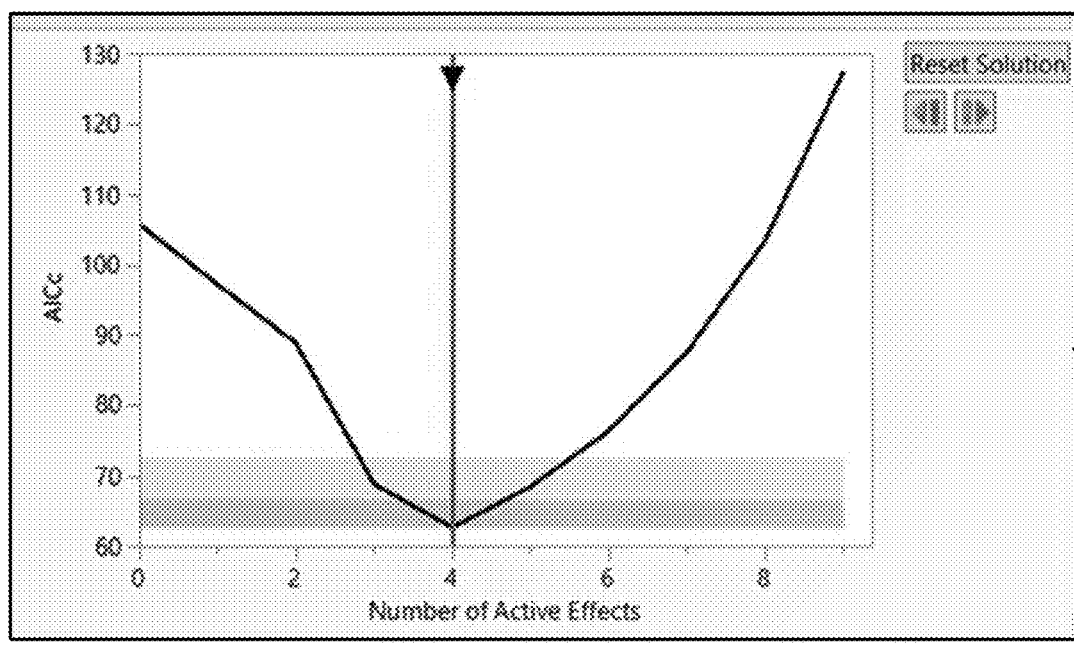

FIG. 16A shows a model comparison area 1602 that allows a user to compare a model generated in guided usage mode to one or more models generated in flexible usage mode. Model analysis for various selected models in the model comparison area 1602 can then display within the graphical user interface 1600. For example, a portion 1604 of a model summary area shows a model summary for the first model that was estimated using standard least squares. FIG. 16B shows the full model summary area 1640 for the first model in the example in FIG. 16A. FIGS. 16C-16E show additional metrics and graphs for evaluating the first model. For instance, FIG. 16C shows a table 1660 of Parameter Estimates for Original Predictors. FIGS. 16D-16E show Solution Path graphs. FIG. 16D shows a graph 1680 plotting the parameter estimates as a function of the number of active effects. FIG. 16E shows a graph 1690 plotting the AICc as a function of the number of active effects. A design team of different users could have different levels of sophistication such that the team could have an experienced statistician where this level of information can be helpful for accessing a model. The experienced statistician may wish to adjust a model created by another design team member in a guided usage mode or compare that model with other models. In some examples, that team member may wish to replace the model generated in a guided usage mode as shown in FIGS. 17A-17B.

Figure 17A:
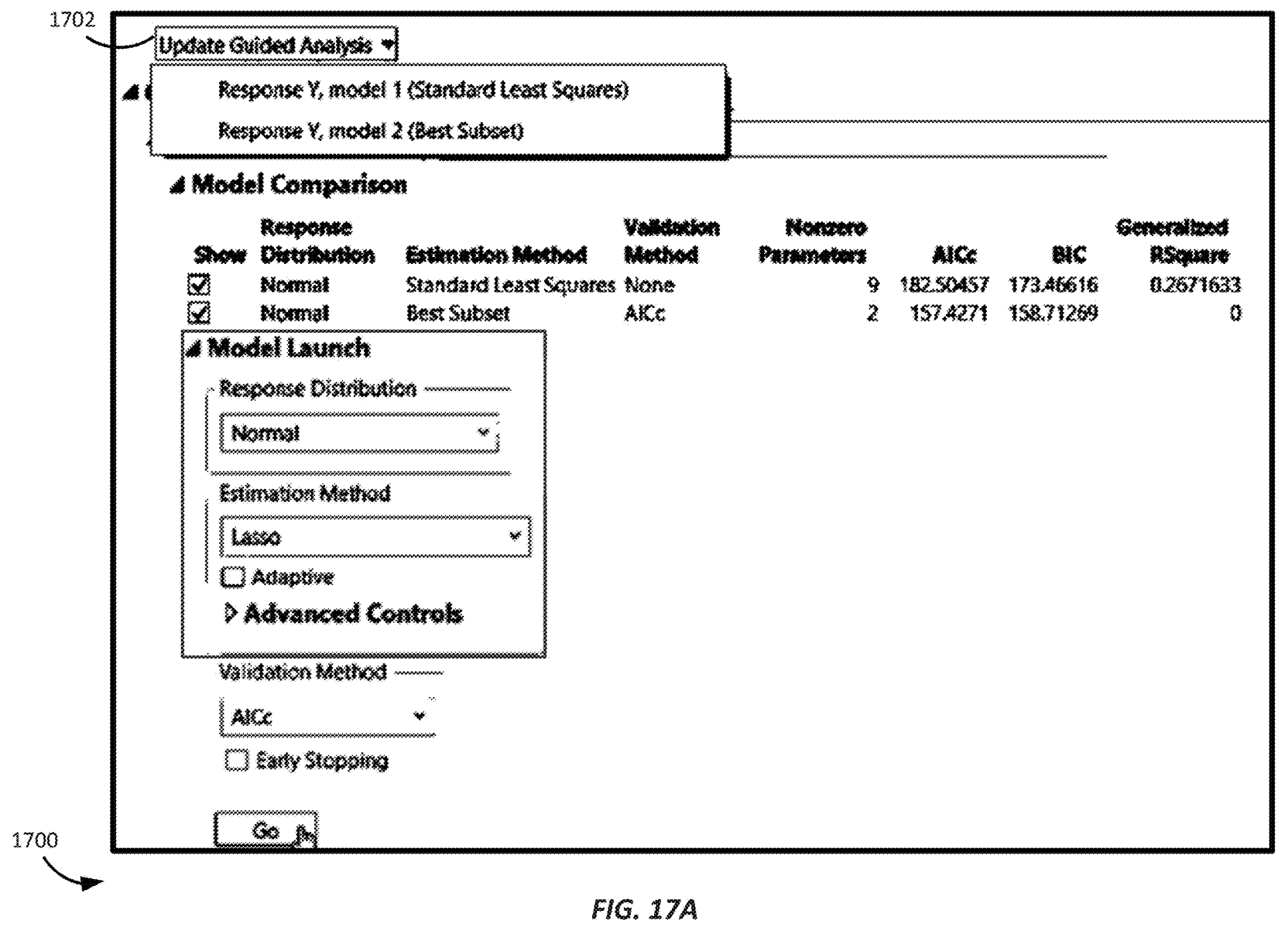
Figure 17B:
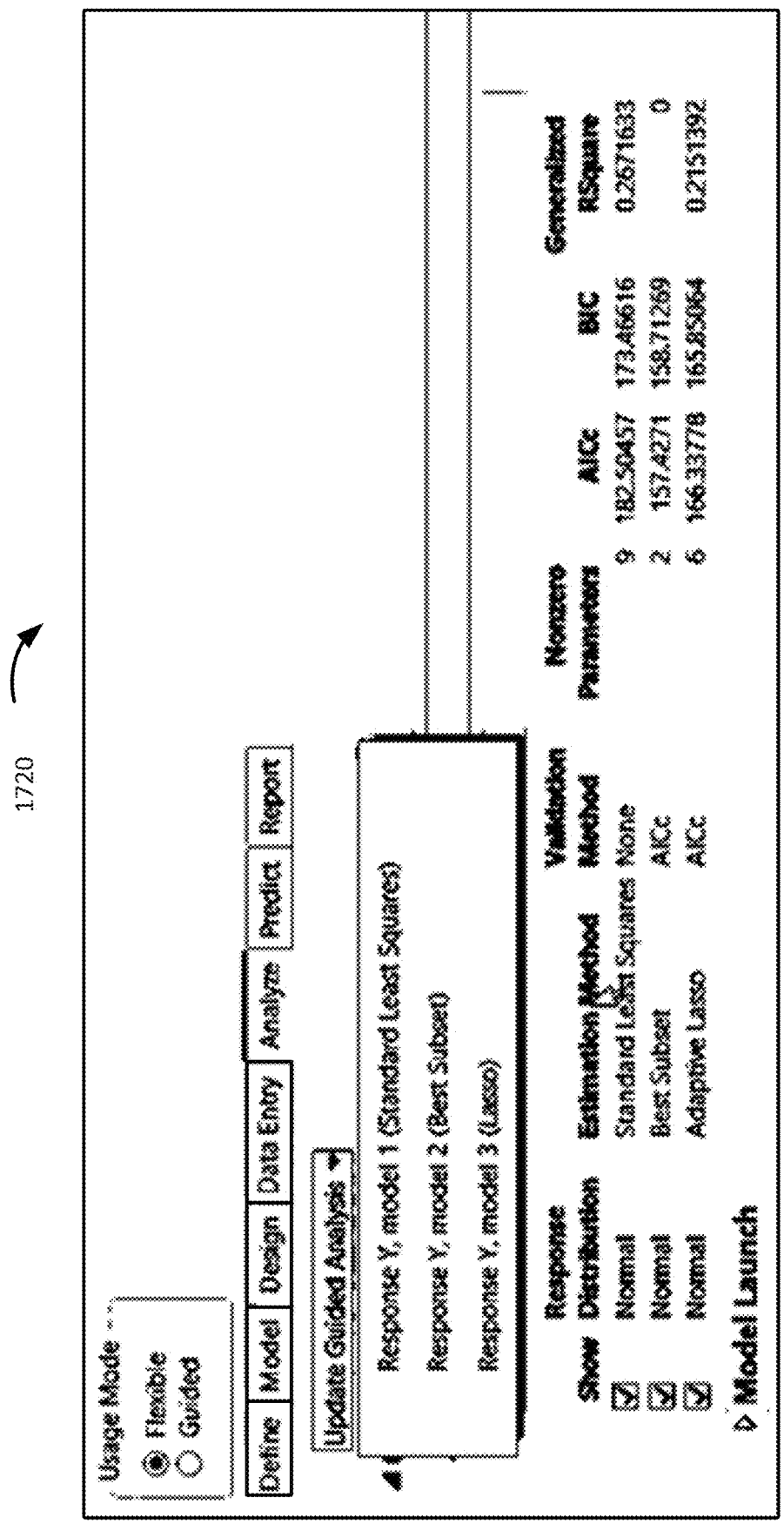

FIGS. 17A-17B illustrate an example graphical user interface for generating a model in a flexible usage mode for use in a guided usage mode. In this example, a user can use one or more user control options in the flexible usage mode to generate a second model for comparison with a first model according to the additional analysis criteria. The first model could be generated according to a user-selected model type (e.g., using a graphical user interface 1000 in FIG. 10A). The user can use a control 1702 to update guided analysis from the model generated according to the user-selected model type in guided usage mode to a second model (e.g., one that is of a different type than a subset of model types provided in the guided usage mode). The computing system in response can receive a user request to change the first model to a second model. Then the user can use the graphical user interface 1700 to further explore the selected model such as simulate, in the guided usage mode, the design according to the second model (e.g., using a simulation panel 1322 in FIG. 13B).

Figure 18A:
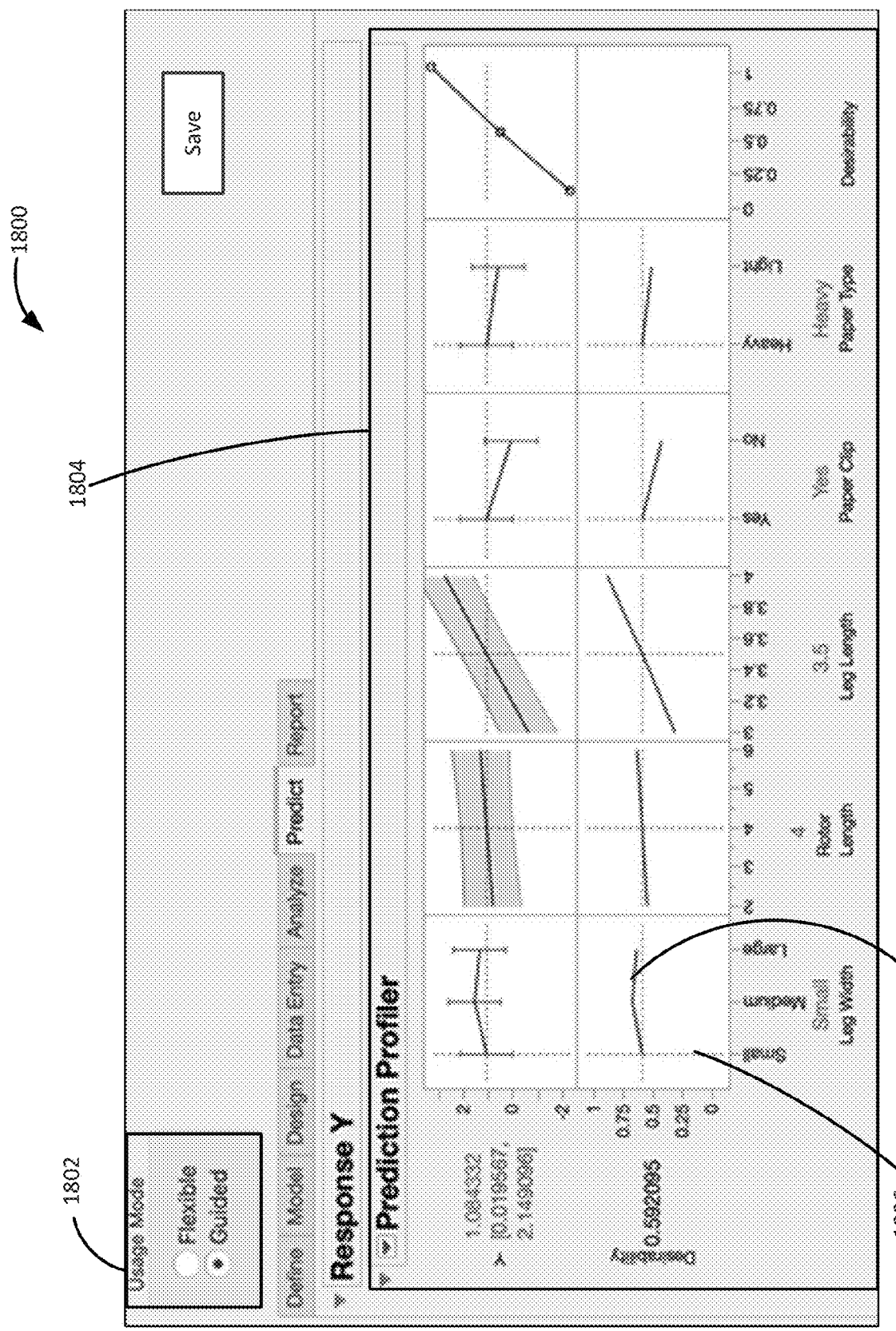
FIG. 18A illustrates an example graphical user interface for generating predictions based on a model according to at least one embodiment of the present technology.

FIG. 18A illustrates an example graphical user interface 1800 for generating predictions based on a model. The graphical user interface 1800 shows options 1802 for two usage modes (flexible and guided) for the graphical user interface 1800. In this example of a guided usage mode, a prediction profiler 1804 is shown for a selected model on a prediction tab. The prediction profiler 1804 shows a plot of desirability and response (Y) as a function of different inputs for the factors shown by handles (vertical red dotted line). For instance, handle 1806 is shown selecting an option of small for a leg width factor. The prediction profiler 1804 shows a profile trace with predicted responses as one option for a factor is changed while others are held constant (e.g., curve 1808 for the leg width factor indicating a prediction that desirability may improve if the leg width was medium). The prediction profiler is interactive in that handles can be moved to adjust options for the factors and the prediction traces will update in response. The prediction tab could be the same for both modes or different. Graphical user interface 1800 is an example of an interface that allows the user to make predictions using a model in the same interface that generated the model.

Figure 18B:
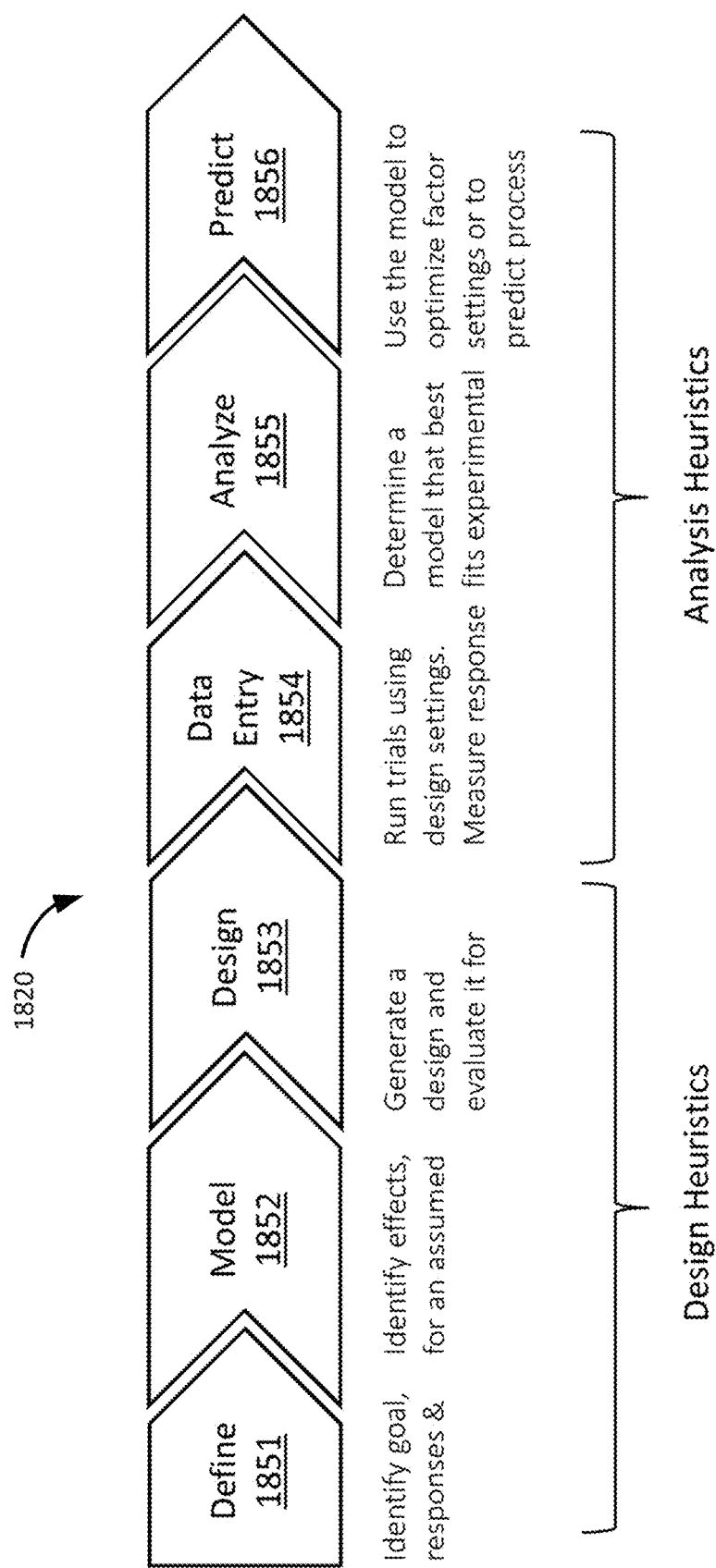
FIG. 18B illustrates an example workflow for generating predictions based on a model according to at least one embodiment of the present technology.

Embodiments herein were shown as separate graphical user interfaces merely to provide different examples of use with different models and designs, but one of ordinary skill in the art will appreciate that a single graphical user interface could be used to encompass an entire design of experiments workflow so that a user does not need to leave a graphical user interface. For example, FIG. 18B illustrates an example design of experiments workflow 1820 for generating predictions based on a model according to at least one embodiment of the present technology. In this example, the define operation 1851 is used to identify goals, responses and factors. The model operation 1852 is used to identify effects for an assumed model. The design operation 1853 is used to generate a design and evaluate it for suitability. The date entry operation 1854 is used to run trials using design settings and/or measure response for each run. The analyze operation 1855 is used to determine a model that best fits experimental data. The predict 1856 is used to use the model to optimize factor settings or to predict process performance.

In one or more embodiments, design of experiments is made easier by encapsulating the entirety of the design of experiments workflow 1820 in one platform by way of a tabbed interfaces (e.g., the ones shown in FIGS. 10-17). The tabs can map directly to operations in other systems. For example, in one aspect, the Describe, Specify, and Design tabs can map to the Custom Designer or Definitive Screening Designer operations, while the Collect tab can map to a Data Table operation and the Analyze and Predict tabs can map to a Fit operation. In another example, the Describe, Specify, and Design tabs can map to a generic DOE design tool (e.g. Design Expert), while the Collect tab can map to a data collection tool (e.g. MICROSOFT EXCEL) and the Analyze and Predict tabs can map to a generic modeling tool. In yet another example, the Define tab can map to Describe an operation, the Model tab to a Specify operation, the Design tab to a Design operation, the Data Entry tab to a Collect operation, the Analyze tab to a Fit operation and the Predict tab to the Predict operation in other platforms. Advantageously both the design and analysis operations can be contained within the same Window/Platform/file. One of ordinary skill in the art will appreciate that workflows could have more, less or different options or labels for moving through the workflow. For instance, one or more embodiments also includes a Report tab for a reporting operation that is not made explicit in this design of experiments workflow 1820.

Figure 19A:
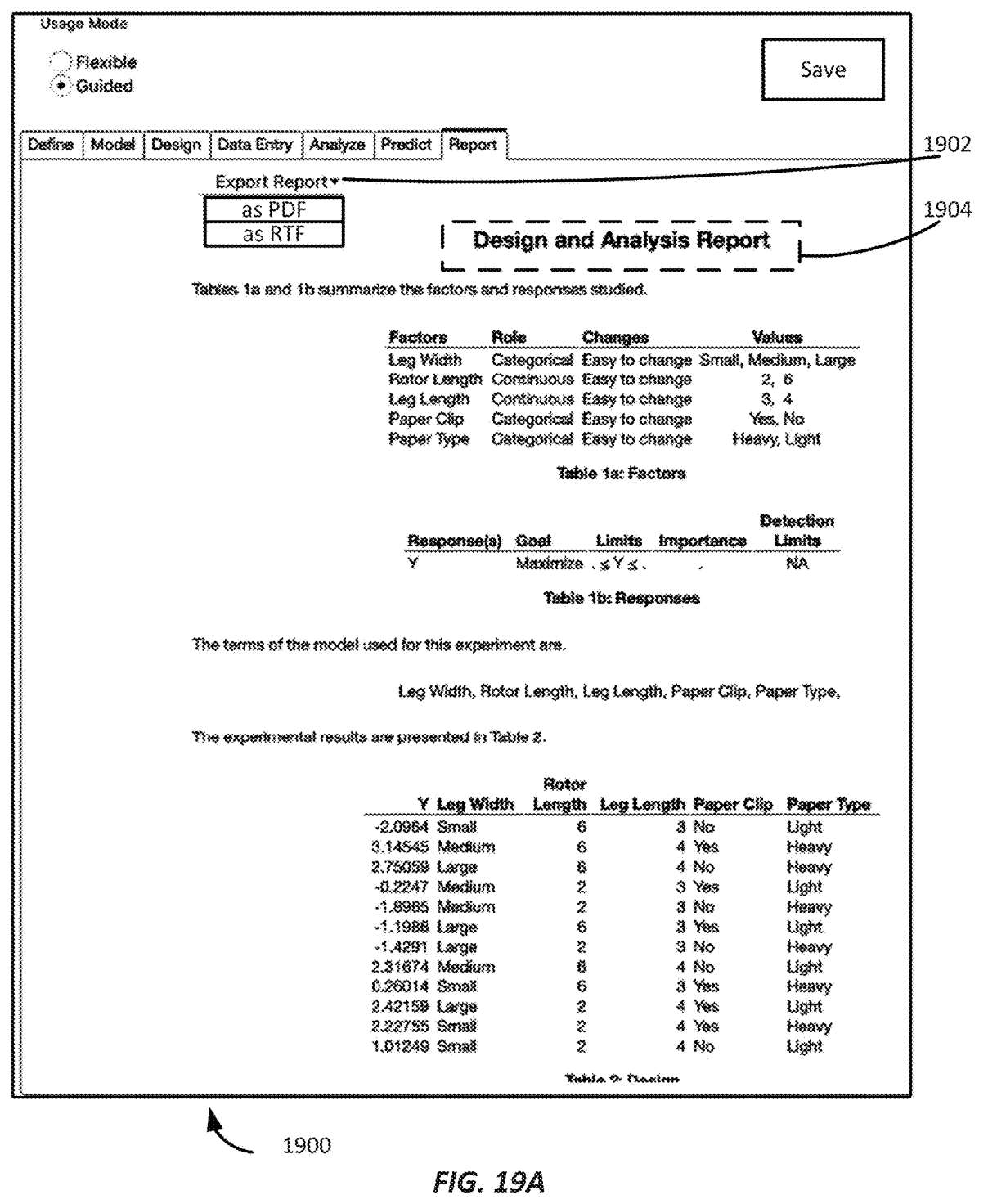

FIGS. 19A-19B illustrate example portions of a graphical user interface for generating a report. FIG. 19A shows a first portion 1900 of an example report tab and FIG. 19B shows a second portion 1920 of an example report tab. The report tab summarizes aspects of the design and analysis in a report form that can be exported in different file types such as a pdf file or as a file in rich text format (.rtf) (e.g., using the export report control 1902). The report is customizable with editable fields for the user to add content or change text (e.g., the title field). The report can be interactive or link to an interactive interface so that as changes are made to other aspects of the model or design (e.g., by other users), the report will update in response (e.g., factors and responses studied, response goals model terms, experimental results, and assessments of models or designs). Embodiments provide tools and new interactive representations for guiding a user in a graphical user interface for greater visibility and understanding of generated designs and models.

What is claimed is:

1. A computer-program product tangibly embodied in a non-transitory machine-readable storage medium, the computer-program product including instructions implementing a computer profiler tool of a computing system to cause a computing system to:
   generate an interactive graphical user interface for display to a user, wherein the interactive graphical user interface is configured to switch between a plurality of operating modes comprising:
      a guided usage operating mode comprising a first set of controls and configured to restrict available user input options used in generating a design of an experiment; and
      a flexible usage operating mode comprising a second set of controls and configured not to restrict the available user input options used in generating the design of the experiment, wherein the second set of controls is different than the first set of controls;
   receive a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;
   responsive to receiving the request, switch the interactive graphical user interface from operating in the current operating mode to operating in the selected operating mode;
   in accordance with the selected operating mode:
      receive, using the interactive graphical user interface, user input for a design of the experiment, wherein the user input indicates:
         one or more respective factor identities for one or more factors in the design of the experiment;
         one or more respective response identities for one or more responses to options for the one or more factors in the design of the experiment; and
         at least one user-defined objective for the one or more responses;
      display, based on the user input, in the interactive graphical user interface:
         a subset of a set of multiple model types; and
         user-definable amount of design runs for the design of an experiment, wherein each design run of the design runs presents settings according to the design for each of the one or more factors;
      receive, in the interactive graphical user interface, settings indicating:
         a user-selected model type from the subset; and
         a user-defined amount of design runs;
      based on one or more of the settings, select one or more design construction criteria for generating the design of the experiment;
      generate the design of the experiment according to the one or more design construction criteria, wherein the computing system is configured to:
         generate the design in the guided usage operating mode that limits the model types to the subset of the set of multiple model types; and
         generate a first model according to the user-selected model type from the subset;
      receive a user request to change the first model to a second model that is of a type different than the subset of the set of multiple model types; and
      execute a computer simulation of the design of the experiment, wherein to execute the computer simulation of the design, the computer system is configured to simulate, in the guided usage operating mode, the design according to the second model; and
   wherein the instructions implementing the computer profiler tool are operable to cause the computing system to:
      receive the one or more respective factor identities by receiving them in the flexible usage operating mode; and
      display the subset of the set of multiple model types by:
         receiving a request to switch to the guided usage operating mode that restricts one or more options for user input available in the flexible usage operating mode; and
         generating a computer correction to the user input based on restricted options for the user input in the guided usage operating mode.

2. The computer-program product of claim 1,
   wherein the computing system generates the design in the guided usage operating mode that excludes one or more factor types for the factors in the design of the experiment; and
   wherein the factor types comprise one or more of continuous, discrete numeric, categorical, blocking, covariate, mixture, constant, and uncontrolled factor types.

3. A computer-program product tangibly embodied in a non-transitory machine-readable storage medium, the computer-program product including instructions implementing a computer profiler tool of a computing system to cause a computing system to:
   generate an interactive graphical user interface for display to a user, wherein the interactive graphical user interface is configured to switch between a plurality of operating modes comprising:

a guided usage operating mode comprising a first set of controls and configured to restrict available user input options used in generating a design of an experiment; and a flexible usage operating mode comprising a second set of controls and configured not to restrict the available user input options used in generating the design of the experiment, wherein the second set of controls is different than the first set of controls;

receive a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;

responsive to receiving the request, switch the interactive graphical user interface from operating in the current operating mode to operating in the selected operating mode;

in accordance with the selected operating mode:
  receive, using the interactive graphical user interface, user input for a design of the experiment, wherein the user input indicates:
    one or more respective factor identities for one or more factors in the design of the experiment;
    one or more respective response identities for one or more responses to options for the one or more factors in the design of the experiment; and
    at least one user-defined objective for the one or more responses;
  display, based on the user input, in the interactive graphical user interface:
    a subset of a set of multiple model types; and
    user-definable amount of design runs for the design of an experiment, wherein each design run of the design runs presents settings according to the design for each of the one or more factors;
  receive, in the interactive graphical user interface, settings indicating:
    a user-selected model type from the subset; and
    a user-defined amount of design runs;
  based on one or more of the settings, select one or more design construction criteria for generating the design of the experiment;
  generate the design of the experiment according to the one or more design construction criteria, wherein the computing system is configured to:
    generate the design in the guided usage operating mode that limits the model types to the subset of the set of multiple model types; and
    generate a first model according to the user-selected model type from the subset;
  receive a user request to change the first model to a second model that is of a type different than the subset of the set of multiple model types; and
execute a computer simulation of the design of the experiment, wherein to execute the computer simulation of the design, the computer system is configured to simulate, in the guided usage operating mode, the design according to the second model; and wherein the instructions implementing the computer profiler tool are operable to cause the computing system to:
  display the subset of the set of multiple model types, and select the one or more design construction criteria, in the guided usage operational mode;
  receive a request to switch the current operating mode of the interactive graphical user interface to the flexible usage operational mode;
  display, in the interactive graphical user interface, one or more options for each of a plurality of design platforms for generating the design in the flexible usage operational mode;
  receive a user selection of a displayed option that is restricted in the guided usage operational mode; and
  generate the design of the experiment according to the user selection of the displayed option.

4. A computer-program product tangibly embodied in a non-transitory machine-readable storage medium, the computer-program product including instructions implementing a computer profiler tool of a computing system to cause a computing system to:
generate an interactive graphical user interface for display to a user, wherein the interactive graphical user interface is configured to switch between a plurality of operating modes comprising:
  a guided usage operating mode comprising a first set of controls and configured to restrict available user input options used in generating a design of an experiment; and
  a flexible usage operating mode comprising a second set of controls and configured not to restrict the available user input options used in generating the design of the experiment, wherein the second set of controls is different than the first set of controls;
receive a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;
responsive to receiving the request, switch the interactive graphical user interface from operating in the current operating mode to operating in the selected operating mode;
in accordance with the selected operating mode:
  receive, using the interactive graphical user interface, user input for a design of the experiment, wherein the user input indicates:
    one or more respective factor identities for one or more factors in the design of the experiment;
    one or more respective response identities for one or more responses to options for the one or more factors in the design of the experiment; and
    at least one user-defined objective for the one or more responses;
  display, based on the user input, in the interactive graphical user interface:
    a subset of a set of multiple model types; and
    user-definable amount of design runs for the design of an experiment, wherein each design run of the design runs presents settings according to the design for each of the one or more factors;
  receive, in the interactive graphical user interface, settings indicating:
    a user-selected model type from the subset; and
    a user-defined amount of design runs;
  based on one or more of the settings, select one or more design construction criteria for generating the design of the experiment;

generate the design of the experiment according to the one or more design construction criteria, wherein the computing system is configured to:
  generate the design in the guided usage operating mode that limits the model types to the subset of the set of multiple model types; and
  generate a first model according to the user-selected model type from the subset;
receive a user request to change the first model to a second model that is of a type different than the subset of the set of multiple model types; and
execute a computer simulation of the design of the experiment, wherein to execute the computer simulation of the design, the computer system is configured to simulate, in the guided usage operating mode, the design according to the second model; and
wherein the instructions implementing the computer profiler tool are operable to cause the computing system to:
generate a first model based on the design;
generate an analysis of the first model in the guided usage operating mode for the interactive graphical user interface, wherein the guided usage operating mode restricts user control of model construction;
receive a request to switch the current operating mode of the interactive graphical user interface from the guided usage operating mode to the flexible usage operating mode; and
display in the interactive graphical user interface:
  additional analysis criteria than displayed in the guided usage operating mode; and
  one or more user control options for generating a second model for comparison with the first model according to the additional analysis criteria.

5. A computer-implemented method comprising:
generating an interactive graphical user interface for display to a user, wherein the interactive graphical user interface is configured to switch between a plurality of operating modes comprising:
  a guided usage operating mode comprising a first set of controls and configured to restrict available user input options used in generating a design of an experiment; and
  a flexible usage operating mode comprising a second set of controls and configured not to restrict the available user input options used in generating the design of the experiment, wherein the second set of controls is different than the first set of controls;
receiving a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;
switching the interactive graphical user interface from operating in the current operating mode to operating in the selected operating mode;
in accordance with the selected operating mode:
  receiving, using the interactive graphical user interface, user input for a design of the experiment, wherein the user input indicates:
    one or more respective factor identities for one or more factors in the design of the experiment;
    one or more respective response identities for one or more responses to options for the one or more factors in the design of the experiment; and
    at least one user-defined objective for the one or more responses;
  displaying, based on the user input, in the interactive graphical user interface:
    a subset of a set of multiple model types; and
    a user-definable amount of design runs for the design of an experiment, wherein each design run of the design runs presents settings according to the design for each of the one or more factors;
  receiving, in the interactive graphical user interface, settings indicating:
    a user-selected model type from the subset; and
    a user-defined amount of design runs;
  based on one or more of the settings, selecting one or more design construction criteria for generating the design of the experiment;
  generating, by a computing system, the design of the experiment according to the one or more design construction criteria, wherein generating the design of the experiment comprises:
    generating the design in the guided usage operating mode that limits the model types to the subset of the set of multiple model types; and
    generating a first model according to the user-selected model type from the subset;
  receiving a user request to change the first model to a second model that is of a type different than the subset of the set of multiple model types; and
  executing a computer simulation of the design of the experiment, wherein executing the computer simulation of the design comprises simulating, in the guided usage operating mode, the design according to the second model; and
wherein the receiving the one or more respective factor identities comprises receiving the one or more respective factor identities in the flexible usage operating mode; and
wherein the displaying the subset of the set of multiple model types comprises:
  receiving a request to switch to the guided usage operating mode that restricts one or more options for user input available in the flexible usage operating mode; and
  generating a computer correction to the user input based on restricted options for the user input in the guided usage operating mode.

6. A computer-implemented method comprising:
generating an interactive graphical user interface for display to a user, wherein the interactive graphical user interface is configured to switch between a plurality of operating modes comprising:
  a guided usage operating mode comprising a first set of controls and configured to restrict available user input options used in generating a design of an experiment; and
  a flexible usage operating mode comprising a second set of controls and configured not to restrict the available user input options used in generating the design of the experiment, wherein the second set of controls is different than the first set of controls;
receiving a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;

switching the interactive graphical user interface from operating in the current operating mode to operating in the selected operating mode;

in accordance with the selected operating mode:
  receiving, using the interactive graphical user interface, user input for a design of the experiment, wherein the user input indicates:
    one or more respective factor identities for one or more factors in the design of the experiment;
    one or more respective response identities for one or more responses to options for the one or more factors in the design of the experiment; and
    at least one user-defined objective for the one or more responses;
  displaying, based on the user input, in the interactive graphical user interface:
  a subset of a set of multiple model types; and
  a user-definable amount of design runs for the design of an experiment, wherein each design run of the design runs presents settings according to the design for each of the one or more factors;
  receiving, in the interactive graphical user interface, settings indicating:
  a user-selected model type from the subset; and
  a user-defined amount of design runs;
  based on one or more of the settings, selecting one or more design construction criteria for generating the design of the experiment;
  generating, by a computing system, the design of the experiment according to the one or more design construction criteria, wherein generating the design of the experiment comprises:
    generating the design in the guided usage operating mode that limits the model types to the subset of the set of multiple model types; and
    generating a first model according to the user-selected model type from the subset;
  receiving a user request to change the first model to a second model that is of a type different than the subset of the set of multiple model types; and
  executing a computer simulation of the design of the experiment, wherein executing the computer simulation of the design comprises simulating, in the guided usage operating mode, the design according to the second model; and
wherein the displaying the subset of the set of multiple model types comprises
displaying in the guided usage operating mode;
wherein the selecting the one or more design construction criteria comprises selecting in the guided usage operating mode; and
wherein the computer-implemented method further comprises:
  receiving a request to switch to the flexible usage operating mode;
  displaying, in the interactive graphical user interface, one or more options for each of design platforms for generating the design in the flexible usage operating mode;
  receiving a user selection of a displayed option that is restricted in the guided usage operating mode; and
  generating the design of the experiment according to the user selection of the displayed option.

7. A computer-implemented method comprising:
generating an interactive graphical user interface for display to a user, wherein the interactive graphical user interface is configured to switch between a plurality of operating modes comprising:
  a guided usage operating mode comprising a first set of controls and configured to restrict available user input options used in generating a design of an experiment; and
  a flexible usage operating mode comprising a second set of controls and configured not to restrict the available user input options used in generating the design of the experiment, wherein the second set of controls is different than the first set of controls;
receiving a request to switch operating the interactive graphical user interface from a current operating mode to a selected operating mode, wherein the current operating mode is one of the guided usage and flexible usage operating modes, and wherein the selected operating mode is the other of the guided usage and flexible usage operating modes;
switching the interactive graphical user interface from operating in the current operating mode to operating in the selected operating mode;
in accordance with the selected operating mode:
  receiving, using the interactive graphical user interface, user input for a design of the experiment, wherein the user input indicates:
    one or more respective factor identities for one or more factors in the design of the experiment;
    one or more respective response identities for one or more responses to options for the one or more factors in the design of the experiment; and
    at least one user-defined objective for the one or more responses;
  displaying, based on the user input, in the interactive graphical user interface:
  a subset of a set of multiple model types; and
  a user-definable amount of design runs for the design of an experiment, wherein each design run of the design runs presents settings according to the design for each of the one or more factors;
  receiving, in the interactive graphical user interface, settings indicating:
  a user-selected model type from the subset; and
  a user-defined amount of design runs;
  based on one or more of the settings, selecting one or more design construction criteria for generating the design of the experiment;
  generating, by a computing system, the design of the experiment according to the one or more design construction criteria, wherein generating the design of the experiment comprises:
    generating the design in the guided usage operating mode that limits the model types to the subset of the set of multiple model types; and
    generating a first model according to the user-selected model type from the subset;
  receiving a user request to change the first model to a second model that is of a type different than the subset of the set of multiple model types; and
executing a computer simulation of the design of the experiment, wherein executing the computer simulation of the design comprises simulating, in the guided usage operating mode, the design according to the second model; and wherein the computer-implemented method further comprises:
 generating a first model based on the design;
 generating an analysis of the first model in the guided usage operating mode for the interactive graphical user interface, wherein the guided usage operating mode restricts user control of model construction;
 receiving a request to switch from the guided usage operating mode to the flexible usage operating mode for the interactive graphical user interface; and
 displaying in the interactive graphical user interface:
  additional analysis criteria than displayed in the guided usage operating mode, and
  one or more user control options for generating a second model for comparison with the first model according to the additional analysis criteria.

\* \* \* \* \*